US008102586B2

(12) United States Patent
Albahri

(10) Patent No.: US 8,102,586 B2
(45) Date of Patent: Jan. 24, 2012

(54) ELECTRONIC WINDOW SHADING SYSTEM FOR HOUSES, TRANSPORT VEHICLES AND THE LIKE

(75) Inventor: Tareq Abduljalil Albahri, Jaber Al-Ali (KW)

(73) Assignee: Kuwait University, Safat (KW)

( * ) Notice: Subject to any disclaimer, the term of this patent is extended or adjusted under 35 U.S.C. 154(b) by 509 days.

(21) Appl. No.: 11/781,932

(22) Filed: Jul. 23, 2007

(65) Prior Publication Data
US 2009/0027759 A1    Jan. 29, 2009

(51) Int. Cl.
G02F 1/15 (2006.01)
(52) U.S. Cl. ........................................................ 359/265
(58) Field of Classification Search .......... 359/265–275, 359/601, 277, 361; 250/201.1, 203.4; 349/13, 349/14, 15, 16, 115, 116
See application file for complete search history.

(56) References Cited

U.S. PATENT DOCUMENTS

| | | | |
|---|---|---|---|
| 4,081,934 A | 4/1978 | Franz | |
| 4,083,356 A | 4/1978 | Rajagopal | |
| 4,268,126 A | 5/1981 | Mumford | |
| 4,475,031 A | 10/1984 | Mockovciak | |
| 4,623,222 A | 11/1986 | Itoh | |
| 4,773,735 A * | 9/1988 | Ukrainsky et al. | 349/161 |
| 4,832,468 A | 5/1989 | Ito | |
| 4,893,902 A | 1/1990 | Baughman | |
| 4,893,908 A | 1/1990 | Wolf | |
| 4,899,503 A | 2/1990 | Baughman | |
| 5,005,009 A * | 4/1991 | Roberts | 345/7 |
| 5,009,044 A | 4/1991 | Baughman | |
| 5,025,602 A | 6/1991 | Baughman | |
| 5,111,629 A | 5/1992 | Baughman | |
| 5,152,111 A | 10/1992 | Baughman | |
| 5,197,242 A | 3/1993 | Baughman | |
| 5,390,045 A | 2/1995 | Bernard | |
| 5,486,937 A | 1/1996 | Yano | |
| 5,587,828 A | 12/1996 | Bernard | |
| 5,598,293 A | 1/1997 | Green | |
| 5,638,202 A | 6/1997 | Rofe | |
| 5,699,133 A | 12/1997 | Furuta | |
| 5,796,454 A | 8/1998 | Ma | |
| 5,940,150 A | 8/1999 | Faris | |
| 5,940,216 A | 8/1999 | Gibbs | |
| 6,072,549 A | 6/2000 | Faris | |
| 6,094,290 A | 7/2000 | Crawford | |
| 6,486,928 B1 | 11/2002 | Lin | |
| 6,580,472 B1 | 6/2003 | Willingham | |
| 6,671,008 B1 | 12/2003 | Li | |
| 6,710,823 B2 | 3/2004 | Faris | |
| 6,714,340 B2 * | 3/2004 | Wright | 359/296 |
| 6,738,114 B1 | 5/2004 | Faris | |
| 6,789,362 B1 | 9/2004 | Hessabi | |
| 6,819,367 B1 | 11/2004 | Cava | |
| 6,888,677 B2 * | 5/2005 | Condo et al. | 359/498 |

(Continued)

*Primary Examiner* — Ricky Mack
*Assistant Examiner* — Tuyen Tra
(74) *Attorney, Agent, or Firm* — Richard C. Litman

(57) ABSTRACT

There is disclosed an automatic electronic window shading (tinting) system for houses and transport vehicles such as automobiles, RV's, trains, boats and the like, to provide shading for people to protect them from exposure to harmful direct sunlight, by providing the windows of said houses and transport vehicles with display elements and light (photocell/photovoltaic) sensors. The system comprises liquid crystal, electrochromic, suspended particle device (SPD), or NanoChromics display (NCD) element attached to a part of a transparent body (such as the windows) and a liquid crystal, electrochromic, suspended particle device (SPD), or Nano-Chromics display (NCD) controlling semiconductor element controlling the operation of the display element.

13 Claims, 26 Drawing Sheets

U.S. PATENT DOCUMENTS

| | | |
|---|---|---|
| 6,952,151 B2 * | 10/2005 | French .......................... 335/296 |
| 6,974,940 B2 * | 12/2005 | Su et al. ........................ 250/204 |
| 6,977,695 B2 | 12/2005 | Faris |
| 7,002,722 B2 | 2/2006 | Xu |
| 7,525,604 B2 * | 4/2009 | Xue ............................... 349/16 |
| 7,537,522 B2 * | 5/2009 | Plavetich et al. ............... 463/36 |
| 2001/0030793 A1 | 10/2001 | Byker |
| 2003/0210355 A1 | 11/2003 | Dao |
| 2005/0068629 A1 | 3/2005 | Fernando |
| 2006/0098290 A1 | 5/2006 | Fernando |

\* cited by examiner

Close-up Half-pattern for less dark shading or tinting

Close-up Diamond-pattern for less dark shading or tinting

Close-up Diamond-pattern center-window for less dark shading or tinting

Close-up Diamond-pattern for less dark shading or tinting

Close-up Half-pattern Half-diagonal window for less dark shading or tinting

Close-up Circular-pattern for less dark shading or tinting

Close-up Circular-pattern for less dark shading or tinting

Close-up Circular-pattern for less dark shading or tinting

ELECTRONIC WINDOW SHADING SYSTEM FOR HOUSES, TRANSPORT VEHICLES AND THE LIKE

FIELD OF THE INVENTION

The field of the present invention relates generally to automatic shading (tinting) systems for transparent surfaces using electronic display elements and, more particularly, to systems for automatically controlling the shading (tinting) of the windows of houses and transportation vehicles using liquid crystal, electrochromic, suspended particle device (SPD), or NanoChromics display (NCD) element and a controlling semiconductor element controlling the operation of the display element.

BACKGROUND OF THE INVENTION

Often we see very expensive cars with all kind of shabby curtains on the windows to block the sun or for security reasons. The sun being a very helpful part of nature can be bothersome sometimes and it would be nice to be able to adjust its rays. Adjusting the sun rays means to be able to lessen or increase their projections into our surroundings. For instance, a device that will allow us to adjust the sun rays projection into house windows or our car windows would make them more convenient. The electric adjustable shade is very convenient in households, transport vehicles, etc. because it gives the options to reduce or increase the solar projections at our ease. Furthermore it will be more energy efficient by providing more shading during hot sunny periods and less shading during cold less sunny periods.

There exist polarizing sunglasses with lenses that transform from transparent to dark when exposed to daylight. The more commonly known self-tinting sunglasses, for example, work by a process, called photochromism. Sunglasses are coated with silver chloride or silver halide or impregnated with a photosensitive compound that changes chemically in the presence of ultraviolet (UV) light. The molecules morph into a new shape that blocks more light. That won't work for a rear-view mirror, because car windows are themselves tinted to block UV. Other disadvantage of these glasses is that they convert to dark upon exposure to daylight and not necessarily direct sunlight. This means if placed on car windows the car windows will always be dark in the day and transparent only at night with no user control. This is not desirable for houses and automobiles when clear windows in moderate lighting conditions are preferred.

To solve the above problems it is proposed to provide the windows of houses and transportation vehicles with automatic electronic tinting system comprising (1) light sensors such as photocells or solar photovoltaic (PV) cells, (2) an electronic display element such as liquid crystal, electrochromic, suspended particle device (SPD), or NanoChromics display (NCD) element, and (3) an electronic display semiconductor element for controlling the liquid crystal, electrochromic, suspended particle device (SPD), or NanoChromics display (NCD) element, to make it possible to automatically control how dark or transparent the window will be as desired by the user.

PRIOR ART REFERENCE AND DISCUSSION

There commercially exist many applications for electronically controlled liquid crystal displays which can be applied to windows for the purpose of providing automatic tinting or shading. The technology is used in LCD watches and alarm clocks such as high-contrast displays found in homes and offices. Monochrome displays are used in alarm and wall clocks, radio digital tuners, bathroom scales, calculators, wristwatches, the indoor-outdoor thermometers, and MP3 players. There is one on the control panel of the microwave, and yet another, probably, on the refrigerator or dishwasher.

NEW GENIUS LTD of china manufactured Miniature Golf Cart with transparent LCD clock features: Functional windshield with LCD screen, which has time, date, week display, as well as temperature display. The same can be applied in the windows of houses and transport vehicles to electronically display different patterns using liquid crystal pixels to provide shading therein.

New technologies, competing to make affordable, variable-tint windows. Presently, four distinct technologies are positioning themselves for this endeavor, competing for shares of a global architectural glass market that produces an estimated 20 billion square feet of flat glass each year. Domestically, sales of residential window units have grown to over 50 million units. Commercial window sales have increased to nearly 500 million square feet a year.

The new electric variable-tint technologies are liquid crystal, electrochromic, suspended particle device (SPD), and NanoChromics display (NCD) Technology.

A few companies are working with liquid crystals, and a larger number are trying electrochromics. Only one has SPD technology and one has NCD technology. While none of the new technologies have yet established a serious market presence, even a one percent share of the global market would equate to 200 million square feet a year.

(1) Polymer Dispersed Liquid Crystals (PDLCs) discovered by the Austrian botanist Rheinitzer in 1888 liquid crystal is an intermediary substance between a liquid and solid state of matter. In 1963, Williams, while working for RCA discovered that the way light passes through liquid crystal changes when it is stimulated by an electrical charge. This prototype's success marked the beginning of modern liquid crystal display (LCD) technology. Professor of the University of Hull in the U.K. made a scientific breakthrough when he discovered a stable liquid crystal material (biphenyl).

PDLCs were invented at Kent State University in 1983. A major application of these materials is in switchable windows. Developed through a joint venture between 3M Company and Viracon, privacy glass laminates 3M Privacy Film between two panes of glass. The windows are wired to a wall switch that uses the same voltage as standard household appliances. With the flip of a switch you can instantly change the glass from clear to opaque (tinted). Multiple windows can be controlled from one switch and can be connected to a timer. Most uses of PDLCs, however, are confined to privacy applications, where popular uses are found in glass walls for offices, conference rooms, lobbies, and store fronts. Privacy glass also provides unique opportunities for use by homebuilders in bathrooms, entryways, family rooms, bedrooms, and skylights. In the opaque state, the glass diffuses direct sunlight and eliminates 99 percent of the ultraviolet rays.

The electronic automatic shading windows system works using liquid crystals—the same technology that's been used in digital watches and computer screens for years. The liquid crystal film is sandwiched between the glass makeup in a similar way to laminated glass is constructed. The outside skins are made up of glass (normally 5 or 6 mm annealed glass) each side, then a PVB interlayer is inserted on each side to trap and hold the liquid crystal privacy film.

The Liquid Crystal Privacy film is made up from electrically conductive coatings, a polymer matrix and liquid crystals. This film has electrical wiring to be connected to a transformer to supply power for the "On" (clear state) mode.

In the "Off" mode, light travels through the spacing of the molecular arrangement and "twists" as it passes through the naturally twisted liquid crystals and the glass is in a tinted state. Therefore that light filtered from one plane cannot get through the other panel so the panel appears to be "black" (or at least very dark).

In the "On" mode electricity is applied to one of the segments of liquid crystals the molecules rearrange themselves (the crystals are made to untwist) when voltage is applied and the previously-twisted light passes straight through and is visible on the other side and the glass is in a clear state. Segments are switched ON and OFF to form the images you see on the window, for as long as the voltage is maintained.

Liquid crystal technology has not been a commercial success. The windows are hazy because they scatter rather than absorb light, so there is a fog factor even when the device is in the transparent state. Also, while liquid crystals work well for interior privacy control, the technology is all-or-nothing, ON or OFF and therefore was not used as a shading device. It also tends to be a little expensive for most popular applications, running between $85 and $150 a square foot.

(2) Electrochromic Windows

Another electric variable-tint window technology, perhaps with a brighter future than liquid crystals, are electrochromic windows, which also attempt to control the amount of daylight and solar heat gain through the windows of buildings and vehicles. As with liquid crystals, a small voltage is required, although in the case of electrochromics the voltage causes the windows to darken; reversing the voltage causes them to lighten.

Electrochromic windows consist of up to seven layers of material, the central three layers sandwiched between two layers of a transparent conducting oxide material, all of which are further sandwiched between two layers of glass. All five layers are transparent to visible light. These windows function as the result of transport of charged ions from an ion storage layer, through an ion conducting layer into an electrochromic layer. The presence of the ions in the electrochromic layer changes its optical properties, causing it to absorb visible light, the result of which is the window darkens. To reverse the process, the voltage is reversed, driving the ions in the opposite direction, out of the electrochromic layer, through the ion conducting layer, and back into the ion storage layer. As the ions migrate out of the electrochromic layer, it brightens, and the window becomes transparent again.

Unlike liquid crystals, however, electrochromic windows can be adjusted to control the amount of light and heat passing through them, a characteristic suggesting a variety of applications. Unfortunately, the electrochromic process is slow, especially when compared to the newer SPD technology. It can take six seconds for something as small as an automobile's rear-view mirror to go from clear to dark, and it may take 10 seconds to return to clear. But for something the size of a window it may take six to 10 minutes to change. SPD windows, on the other hand, react in two seconds or less, regardless of the window size. In certain areas, such as rear-view mirrors, SPD technology goes a lot faster than that. Plus, you can use a knob or rheostat to control an SPD window. You can't do that with electrochromics because there would be a six minute delay—you'd never get the knob right. Most people want instant feedback to adjust their window properly and SPD is the only one that will allow you to do that. Electrochromic windows are also expensive, costing on the order of $125 per square foot.

(3) Suspended Particle Device (SPD) Technology

SPD, though the newest of the window technologies, is the result of 34 years of research on light-valve glass technology by physicist Robert Saxe, founder and CEO of Research Frontiers. SPD technology actually originated over 100 years ago, when light-absorbing crystals were first discovered, supposedly through an accident with dog urine. According to folklore, an English chemist noticed that a dog that had been fed quinine bisulfate (perhaps for an upset stomach) had urinated in a tray of iodine. From this accident, green crystals (called herapathite) formed in the tray, and the chemist realized that they were able to filter out light. Edwin Land, inventor of the Polaroid camera, was later the first to fashion an SPD device. Failing in an attempt to make large thin sheets of polarizing iodine compounds, he turned to making submicroscopic crystals by the billions. These he found could be spread on plastic sheets and lined up by electric or magnetic fields. When two such sheets were rotated with respect to each other, a clear view would gradually change to black. Land's research resulted in 535 patents, second only to Thomas Edison in terms of patent count.

In SPD there is millions of black, light-absorbing, suspended-particle devices (SPD) within a film placed between the glass layers. When a moderate voltage of electricity is applied to the film, the SPDs line up and become perpendicular to the window, allowing more light and increased visibility until the window is completely clear. As the amount of voltage is decreased, the window becomes darker until it reaches a bluish-black color that allows no light to pass through it. In other words, in the "OFF" state, when no voltage is applied, the particles (whose exact nature is proprietary) are randomly dispersed and therefore absorb light, creating an opaque appearance. Conversely, when in the "ON" state the particles orient (or align) changing the character of the glass from opaque to clear. By adjusting the voltage anywhere between "OFF" and "ON", the degree of light can thereby be precisely controlled. Therefore, the user has complete control over the amount of transmitted light from the glass or plastic walls.

The black particles are a recent improvement. In the past, particles used in SPDs generally looked dark blue when the device was in its "OFF" state due to the particles' inability to absorb blue light well. The new particles look nearly black because they absorb light well throughout the entire spectrum. Black or gray colors are more desirable because they're neutral, are preferred for most applications.

When used in conjunction with Low-E (low emissivity) glass, SPD can also be used to block ultraviolet light (U-factor). Low-E coatings, sometimes called heat-smart, are microscopically thin, virtually invisible, metallic oxide layers deposited on a window or skylight glazing surface primarily to reduce the U-factor by suppressing radiative heat flow. Low-E coatings are transparent to visible light and different types have been designed to allow for high solar gain, moderate solar gain, or low solar gain.

Of the electric variable-tint window technologies, SPD, in which the user can instantaneously control the passage of light through glass or plastic, appears to be the most promising in terms of cost and performance. It can be controlled either automatically by means of a photocell or other sensing or control device, or adjusted manually with a rheostat or remote control by the user.

SPD, which produces little or no haze in the transparent state, can be used in windows in homes, office building windows, skylights and sun roofs (to say nothing of ski goggles and sunglasses, aviation instruments, automobile dashboard displays and bright, high-contrast digital displays for laptop and other electronic instruments) made with this new SPD technology can now be dimmed or brightened with electronic precision to suit individual needs, allowing an infinite range of adjustment between completely dark and completely clear.

The lab, which currently hold over 350 U.S. and foreign patents and patent applications on the technology, now licenses its technology to such manufacturers as Dai Nippon Ink & Chemicals, General Electric, Hitachi Chemical, Hankuk Glass Industries, and Material Sciences Corp., San Diego. ThermoView Industries, Louisville, became the first domestic manufacturer specializing in products for the $8 billion replacement window/door industry licensed to produce SPD electric variable-tint windows. In spite of all the licensing activity, developing the technology and manufacturing processes has been long and difficult, and SPD windows have yet to appear on the market.

The retail price of the SPD windows after the addition of the particle film will not increase the cost of windows by more than about 20 percent, adding about $15 per square foot, which is considerable less expensive than either liquid crystal or electrochromic windows.

(4) NanoChromics Display (NCD) Technology.

Electrochromism has been known for decades; IBM, for example, had a major development program in electrochromic displays in the 1970s and early 1980s. Bayer AG, in Leverkusen, Germany, also researched the technology and was even awarded several patents, but it also failed to make a practical display. Today, a number of companies in Europe and the United States are still trying to turn the phenomenon into products, including Siemens, Aveso, and Acreo.

Now a Dublin, Ireland, Ntera Ltd. is ramping up the first commercial production line to produce a technology the company calls the NanoChromics display (NCD). The Ntera story begins in the early 1990s in Switzerland. It was there, at the École Polytechnique Fédérale de Lausanne (EPFL), that Donald Fitzmaurice from University College Dublin, and Michael Graetzel, a professor in EPFL's Institute of Chemical Sciences and Engineering, began investigating how nano-sized particles, placed in a nanostructured film retained many of the properties of the film material used. One day in 1991, Fitzmaurice noticed that these nanostructured semiconductors darkened slightly when he applied current. Fitzmaurice and Graetzel attached electrochromic molecules to a film of semiconducting nanoparticles, effectively creating a film that was many hundreds of layers of electrochromic molecules thick. A charge applied through the semiconducting particles caused the molecules at the surface to be charged and therefore to change color. Because the film was many layers of particles thick, the optical change, barely detectable in only one layer of particles, was surprisingly dramatic.

In NCD, the principle requires electrically charging a material to change its color. Placing another charge-storing layer on the second glass sheet as a source of charge for the electrochromic material lets the image remain for as long as several hours. This is because both plates separately retain their opposite charges, in much the same way as a capacitor retains its charge. To clear the display, the voltage is reversed, sending the ions back to the storage layer. Depending on the chemicals used and the application, a new jolt of current may be needed infrequently, from every 10 minutes to once an hour. Basically, the display draws current only when the image is changed.

The two sheets of glass are bonded together at their edges. The inner area between them is filled with an electrolyte solution that balances the charges on the two sheets. The color-changing layer is attached to the piece of glass that forms the front of the display. This layer is, at heart, a film of titanium dioxide particles 15 nanometers in diameter—smaller than the wavelengths of light and therefore transparent. The electrochromic molecules are coated on each of the nanoparticles, forming a layer a bit like the coating on a tennis ball. An electrolyte is used to help stabilize the system as a whole.

Etching pixel patterns on the glass mimics the analogous method in LCD manufacture, and the screen-printing process is used in both manufacturing schemes. LCD panels are then coated with a layer to allow alignment of the liquid crystals, and NanoChromics panels are dipped in a solution that contains the electrochromic molecules, which attach themselves to the semiconducting particles in the nanostructured titanium dioxide film. An oven is used to bake the nanoparticles that form the film.

NanoChromics Display have a high contrast ratio and a wide viewing angle, switched fairly quickly, consume little power, and is cheap to manufacture. It's visible everywhere, even in bright sunlight. NCD produces stark, razor sharpness, with nearly black images on an almost luminous, paper-white background. Text is easy to read in most lighting conditions, with a contrast ratio of 6:1—and a brightness of at least 4 times that of an LCD. Nevertheless, the two display technologies do share a few traits: they both have two glass sheets separated by a fluid-filled gap and therefore weigh about the same. But in power consumption, there's no contest. NCDs are power-frugal because of two factors. First, the high contrast ratio eliminates the need for any kind of separate lighting system, even when viewed in bright sunlight. Second, unlike LCDs, NCDs do not need to be constantly refreshed. Furthermore, one of the big advantages of NCD technology is that it can be migrated onto plastic instead of glass plates because the technology does not require a precise and stable distance between the two plates, as is the case with an LCD. Warping or bending the display may push the electrolyte around a little but has little or no effect on the color-changing molecules that create the image. Yet another possibility is transparent displays. Making an NCD transparent simply means leaving out one of the layers of titanium dioxide particles. In the long run, manufacturing NCDs proves to be cheaper than producing LCDs. For one thing, NCDs have a greater tolerance for defects, and therefore yields are expected to be higher. Organic electroluminescent display (OELD) technology for example, which, like NCD, is potentially flexible, but costs about $3 per square inch to make for flat panel displays. A product of equivalent size containing Ntera's technology would cost a fraction of this—as little as one-tenth, by some estimates.

Electrochromism has its limitations. One of the most significant problems is the delay needed to produce an optical change, one full second or more. Because of this delay, electrochromic applications have shown up only where the tint doesn't need to change quickly—for example, in an automobile's rear-view mirror. A number of cars today are equipped with automatically darkening mirrors began selling to the automotive industry in 1987. By the 1990s, electrochromism started falling out of favor among researchers looking to build the next big thing in digital displays. To protect the device from sunlight which degraded the molecules, a UV-blocking film is used. Finally, an electronic drive system that would switch each pixel ON or OFF was developed and patented. Ntera discarded color-changing glass and mirrors, such as self-tinting windows. The company focused on the low-information display business. Right now, NCD displays are monochromatic, though they can come in different colors, depending on the specific oxide used.

In any of its markets, the NCD will face off against a variety of contenders. LCDs, of course, have the benefit of industry inertia. In addition, several companies have their own electrochromic displays in the works by Siemens AG, in Munich, Germany, Acreo AB, in Kista, Sweden, and Aveso Inc., in Fridley, Minn.

PRIOR ART REFERENCE AND DISCUSSION

It is now possible to instantly turn clear glass into tinted privacy glass with the flip of a switch. The implementation of this technology in the car market and house market is relatively new. The idea in principles is already in use in some houses for energy efficiency and to replace curtains. It is also proposed for cars for hiding the interior from the curious eyes and for security when switched off.

Privacy Glass opens up unique, affordable, design opportunities in buildings, offices, conference rooms, lobbies, stores and homes. Many manufacturers offer windows using Privacy Glass to give homeowners unique design options for any room in their home. For bathrooms, entryways, family rooms, bedrooms and skylights, privacy glass is the perfect choice. Glass storefront windows and entryways, glass display cases and glass counters can all be enhanced with Privacy Glass. The glass not only offers privacy, it can be connected to a timer to turn from clear to tinted to create attractive and attention-getting traffic builders as well. And because privacy glass is laminated like automobile windshields, it offers added safety and security. For added convenience, multiple windows can be turned ON by the same switch.

So far the technology is used in self-dimming rear-view mirrors that change from clear to dark to prevent eye strain and temporary blindness from the glare of headlights approaching from the rear then reversing when conditions permit.

For car roof, electronic glass maximizes the light and comfort inside vehicles in summer and in winter, whatever the sunlight factor, by modulating the transmission of light. The electrochromic roof is made of laminated glass which also gives it a shatter-proof quality. The inner surface of one of the glass sheets is multi-coated with an electrochromic film, around one micron thick. The stacked electrochromic layers act like a battery, the electrodes and electrolyte of which constitute thin layers of transparent minerals whose color changes with the charge. The application of a voltage colors the glass. The glass only needs to be short-circuited or a reverse polarity voltage applied to render it colorless. In the absence of any voltage, the glass has a memory effect and retains its previous coloration. This means that the glass draws current only during the coloring and clearing phases.

The Los Angeles 2005 auto show displayed a unique limited-edition of a Ferrari convertible featuring an all-glass electrochromic roof. The tinted window has five levels of manual shading control, ranging from clear and transparent to a dark, sun-hiding shade. The Ferrari 575 Superamerica is the first production car to adopt an electrochromic technology developed exclusively for glass surfaces of these dimensions. Other prior art electronic tinted windows are provided with manual ON/OFF of individual windows to be set by individual passengers for comfort.

Among the prior art literatures that describe using electronic tinting windows are the U.S. and foreign patents discussed below the teachings of which are incorporated herein by reference. None of these but one discloses systems using incorporating photosensitive devices in conjunction with liquid film devices for the purpose of providing shading inside transportation vehicles.

U.S. Pat. No. 4,083,356 (1978) to Rajagopal discloses a nematic liquid crystal window interposed between incident sunlight and a solar energy collector. The cover (window) changes from a normally highly transparent to an increasingly translucent state, and thereby the energy transmittance of the window to prevent damaging temperatures in the energy collecting system. The disclosure does not claim using the invention for the windows of buildings or moving vehicles.

U.S. Pat. No. 4,268,126 (1981) to Mumford discloses a thermal-pane window unit having an electro-optical shade of adjustable transmittance for reducing radiative and conductive heat transfer between the exterior and interior of a building and, additionally, for presenting an attractive shaded window appearance. The invention utilizes a liquid crystal cell of selectable light transmittance in combination with a conventional dual pane heat insulating window. The disclosed system is manually operated. Furthermore, the disclosure does not claim using the invention for the windows of moving vehicles.

U.S. Pat. No. 4,475,031 (1984) to Mockovciak, Jr. discloses a self-contained sun sensitive window made up of liquid nematic crystals sandwiched between two transparent conductors is powered directly by a solar cell. An increase in light intensity upon the solar cell reduces the transparency of the window, resulting in a constant intensity behind the window. The object of the invention was to provide a self contained sun sensitive window which does not need an external power supply. The electric field necessary to alter the opacity may be derived solely from the light source itself by means of such photosensitive device The disclosure does not claim using the invention for the windows of buildings or moving vehicles.

U.S. Pat. No. 4,623,222 (1986) to Itoh, et al. discloses a liquid crystal type dazzle-free reflection mirror arrangement which changes reflectivity of the incident light by way of changing the transmissivity of the incident light through a liquid crystal provided within a frame body. A semitransparent mirror is positioned behind the liquid crystal and a photo sensor is positioned behind the semitransparent mirror. When the photo sensor detects that the intensity of the incident light passing through the semitransparent mirror, an alternating current electric field is applied to the liquid crystal which responsively decreases the transmissivity of the incident light. A heater for heating the liquid crystal is activated when a door of an automobile is opened and the temperature of the liquid crystal is low. The disclosure does not claim using the invention for the windows of buildings or moving vehicles.

U.S. Pat. No. 4,848,875 (1989), U.S. Pat. No. 4,893,902 (1990), U.S. Pat. No. 4,899,503 (1990), U.S. Pat. No. 4,964,251 (1990), U.S. Pat. No. 5,009,044 (1991), U.S. Pat. No. 5,025,602 (1991), U.S. Pat. No. 5,111,629 (1992), U.S. Pat. No. 5,152,111 (1992) and U.S. Pat. No. 5,197,242 (1993) all to Baughman, et al. disclose a dual-pane thermal window unit mounted in a window frame, comprising an electro-optical liquid crystal cell providing a selected light transmittance, and providing a thermal break for decreasing radiative and conductive heat transfer between the exterior and the interior of a building. The disclosed system is manually operated. Furthermore, the disclosure does not claim using the invention for the windows of moving vehicles.

U.S. Pat. No. 5,486,937 (1996) to Yano, et al. discloses a latex containment means for a liquid crystal window. The invention relates to the making of liquid crystal windows and does not suggest or claim using the liquid crystal window (LCW) for transport vehicles or the automated operation thereof.

U.S. Pat. No. 5,903,247 (1999) to Howard, et al. discloses an apparatus for controlling the opacity of a liquid-crystal window, having a light emitter positioned adjacent to one side of the liquid-crystal window, a light detector positioned adjacent to the opposite side of the liquid-crystal window, and a differential amplifier/driver that compares the output of the light detector with an input control signal and generates a differential drive signal to vary the opacity of said liquid-crystal window. The invention relates to the making of apparatus for automatically controlling the opacity of liquid crystal windows and does not suggest or claim using the invention for transport vehicles.

U.S. Patent Application No. 20010030793 (2001) to Byker, Harlan J.; et al. discloses electrochromic structures, such as windows and panels, provided wherein privacy and changes in the color of an electrochromic medium incorporated in the structures may be either enhanced or hidden when viewed from a predetermined direction, as for example, when viewed from the outside of a building or when viewed from one side of a transparent interior panel in a building. The invention relates to the making of apparatus for automatically controlling the opacity of liquid crystal windows and does not suggest or claim using the invention for transport vehicles.

U.S. Patent Application No. 20050068629 (2005) and U.S. Patent Application No. 20060098290 (2006) both to Fernando, Primal; et al. disclose an adjustably opaque window including provided with a shock-absorbing layer made of flexible sheet that supports and protects the light transmission control layer. The transmission ratio of the cells can be controlled variably. The invention relates to the making of shock-absorbing liquid crystal windows and does not claim using the invention for transport vehicles or the automatic operation thereof.

Japan Patent no. 58126219 (1983) to Kishimoto Kiyotaka discloses a window glass having positive and negative transparent electrode plates and liquid crystal wherein the color of said liquid crystal will change when an electric field between said plates is applied. The color of a part of the window glass may further be changed to display a character or pattern. The invention does not provide for the automatic use in transport vehicles in motion with frequently changing directions and thus shading requirements for different front, side and back windows. An automatic operation in this case is highly desirable.

Japan Patent no. 59167323 (1984) to Sakamoto Takao discloses a semitransparent sunshade apparatus for all the windows of a car at once that is manually operated by using a control switch with variable volume to activate and change the transparency of the liquid crystal window as desired. This manual operation is not convenient for use in transport vehicles which frequently change direction and thus having changing shading requirements for different front, side and back windows. An automatic operation of each separate window in this case is highly desirable.

Japan Patent no. 59220413 (1984) to Ito Hiroshi and Ito Hiroyasu discloses a light intensity adjusting device for car to prevent exhaustion of a battery through utilization of solar cell. The high temperature of the car cabin causes a solar cell to supply the voltage to the liquid crystal panel to put it in dynamic diffused state that will shut the cabin from irradiation of sun beam. Thereby use of the battery is not required for this purpose to contribute to preventing exhaustion of the battery. The invention provides for means to conserve the car battery through using solar energy to conserve the battery and does not provide for the automatic use of the invention in transport vehicles in motion with frequently changing directions and thus shading requirements for different front, side and back windows. An automatic operation in this case is highly desirable.

Japan Patent no. 61057935 (1986) to Otsuka Yasuhiro et al. discloses a liquid crystal element that can control the transmissivity between 20% and 35% of infrared rays electrically by changing applied voltage. When this liquid crystal is applied to window materials of a car, the transmissivity of infrared rays is reduced to prevent rise of temperature in summer, and the transmissivity of infrared rays is increased to prevent lowering of temperature. Thus, energies for a cooler or a heater can be saved. The invention provides for means to conserve the temperature inside the car and does not provide for avoiding exposure to direct sunlight for the comfort of the passengers. Furthermore, the invention does not provide for the automatic use in transport vehicles in motion with frequently changing directions and thus shading requirements for different front, side and back windows. An automatic operation in this case is highly desirable.

Japan Patent no. 61207208 (1986) to Yamamoto et al. discloses an automatic antidazzle window system for car to control excessive quantity of light transmitted into the inside of a car, by installing an impressing voltage between electrodes of a window's liquid crystal layer with detecting output of the light sensor set up at the inside of a window. Each of liquid crystals is installed in front, right side, rear and left side windows, while each of light sensors is installed at the inside of these front, right side, rear and left side windows. Although the invention provides for means to automatically control the exposure to direct sunlight inside the car from individual windows, the control system disclosed provides for constant preset shading degree of all the car windows and does not allow for the offset control of the shading provided by the liquid crystal windows as desired by the passengers for each window separately. An alternate control system in this case is highly desirable to enable the control of the degree of shading in the car in general and of each vehicle window as desired by the individual passengers.

Japan Patent no. 4279560 (1992) to Seimi discloses a new compound capable of carrying out low voltage driving, exhibiting liquid crystal properties till high temperature area, being a low-viscosity material and useful as a liquid crystal electro-optical element having wide temperature area. The liquid crystal display element is useful for display device of watch, desk computer, measuring device, measuring instrument for car, camera or office automation equipment as well as light-conditioning window, optical shutter, polarized light conversion element, and the like. The invention does not claim using the liquid crystal specifically for shading windows of transport vehicles or to automatically control shading in transport conditions with frequently changing directions and thus shading requirements for different front, side and back windows, which is highly desirable.

Japan Patent no. 2000280896 (2000) to Kuriyama et al. discloses sunlight control device for railroad car having a liquid crystal panel comprising a liquid crystal held by an orientation film and also comprising a transparent electrode provided for applying voltage to the orientation film mounted to the inner side of each window for the railroad car. The liquid crystal panel is divided in plural stages oriented horizontally and a manual controller is provided close to the window so as to signal the liquid crystal panels to control shading the sun light starting at the lower side of the correspondent liquid crystal panel and moving upward. The purpose of the invention is to keep off the sun light for the passengers taking seats while allowing the passengers standing still to take look at landscape through windows and does not claim using the liquid crystal specifically to automatically control shading in transport conditions with frequently changing directions and thus shading requirements for different front, side and back windows, which is highly desirable.

Chinese Patent no. 1075556 (1993) to Guangqing Su et al. discloses a controllable color-varying liquid crystal and its manufacturing method wherein the liquid crystal film is enclosed in transparent frame. The invention relates to a manufacturing method and suggests the invention may be used on billboard, high-grade door or window, wind screen of car, and the like, but does not specifically claim using the liquid crystal automatically control shading in vehicles in transport conditions with frequently changing directions and thus shading requirements for different front, side and back windows, which is highly desirable.

The use of an electric shade is much needed, because it allows anyone to feel at ease in a very sunny day. It can be used in many places, but our target is the car windows and house windows. It is so because we realized that, it would be very nice to include an automated operation sun protector to a car or a house, and the like, and to be able to give the options to the owner to decide how she or he wants the level of tint of the windows to be. For the car windows, the level of tint can be designed to meet the maximum tint level regulation given by the Division of Motor Vehicle.

Accordingly, it is an object of the present invention to provide an automatic electronic display shading system which avoids the disadvantages of the prior art.

SUMMARY OF THE INVENTION

In view of forementioned problems we hereby propose a solution that would provide for an automatic electronic system and method that automatically provides shading inside buildings and transportation vehicles (instead of manual) for the comfort of the passengers and dwellers, and for energy efficiency.

ADVANTAGES OF THE PRESENT INVENTION

According to the present invention, variable-tint electronic windows, which produce little or no haze in the transparent state, can be controlled either automatically by means of a photocell or other sensing or control device, or adjusted with a rheostat or remote control by the user. For instance, a small photocell or photovoltaic (solar) cell can be used to sense the amount of sunlight, darkening the window when the sun is brightest then gradually lightening the window, as the sunlight diminishes, a feature attractive in sunny regions. This automated function is very convenient for drivers and home dwellers as sunrays change direction and as sunlight become brighter during the course of the day and especially during driving with frequent turns.

Variable-tint electronic electrical windows boast other benefits. They increase comfort, light and view and decrease condensation. In the scattering (opaque) state, the privacy glass also diffuses annoying sun glare and direct sunlight and eliminates 99% of the UV light transmission rays and reduces solar heat gain to make car interiors, rooms and buildings more comfortable throughout the course of a day automatically. When operated automatically, variable-tint electronic glass offers a unique way to let controlled amount the natural light in while still maintaining privacy. Almost the same amount of light passes through the window when it's tinted. The difference is the light is diffused throughout the room/vehicle instead of being concentrated in one area such as the case with blinds, curtains and drapes.

Variable-tint electronic windows can be used to help keep cars cool. An electrochromic sunroof could automatically darken in the direct sunlight but lighten at other times while keeping the car cool. Conceivably, electrochromic rear or side windows in a vehicle could darken while the car is parked, keeping the car cool, and then lighten again once the car is started. Variable-tint electronic windows, promise to decrease energy use in some buildings up to 40 percent. While regular glass can only allow a constant amount of light, the liquid crystal window can be tuned, or dimmed, permitting any amount of light to pass. At the turn of a knob, the amount of light that shines through windows can be controlled, saving billions of dollars a year in heating, lighting and air-conditioning costs. No need for curtains, blinds, or shades. Efficiency of sun blocking is much better than any kind of known sun block device such as curtain, blind, or shade. With a light sensor, it is possible to always control the amount of light in a room or a vehicle automatically.

Variable-tint electronic electrical windows boast other benefits. Users are given control over their privacy and environment, and harmful ultraviolet rays are blocked, thereby eliminating the fading of furniture, carpets, drapes, artwork, and other valuables not to mention car interior and dashboard. With privacy glass, there is no need for other window treatments like blinds, curtains or shades to control light or glare. The cost of blinds, curtains and drapes are also slashed and in many cases eliminated. Walls of privacy glass allow total privacy or unobstructed viewing through stationary and operating windows and doors, glass walls and skylights. They allow utilizing space while still maintaining privacy in conference and meeting rooms. Since many conference rooms are located near lobbies and central traffic areas, Privacy Glass offers the perfect solution to create beautifully designed rooms with light and space while still maintaining privacy for meetings. Privacy glass is also perfect for skylights, sloped glass and window walls in office buildings and factories. Privacy glass can be incorporated into virtually any type of window system, including insulating, reflective or tinted glass.

Electronic tinting windows are not without problems. However, (1) Initial cost is not expected to be a prohibiting factor with developing technology and, (2) Sensitivity of the display elements to temperature is also not expected to be a problem with the disclosure of Japan Patent no. 4279560 (1992) to Seimi of a new compound capable of carrying out low voltage driving, exhibiting liquid crystal properties till high temperature area, and using a UV-blocking film To protect the display elements from sunlight which degraded the molecules.

BRIEF DESCRIPTION OF THE DRAWINGS

The above and other aspects, features, and advantages of the present invention will be better and more fully understood by those skilled in the art with reference to the following detailed and more particular description of specific and preferred embodiments thereof, presented in conjunction with the following drawings to show how the same may be carried into effect, wherein.

DETAILED DESCRIPTION OF THE INVENTION

Figure 1:
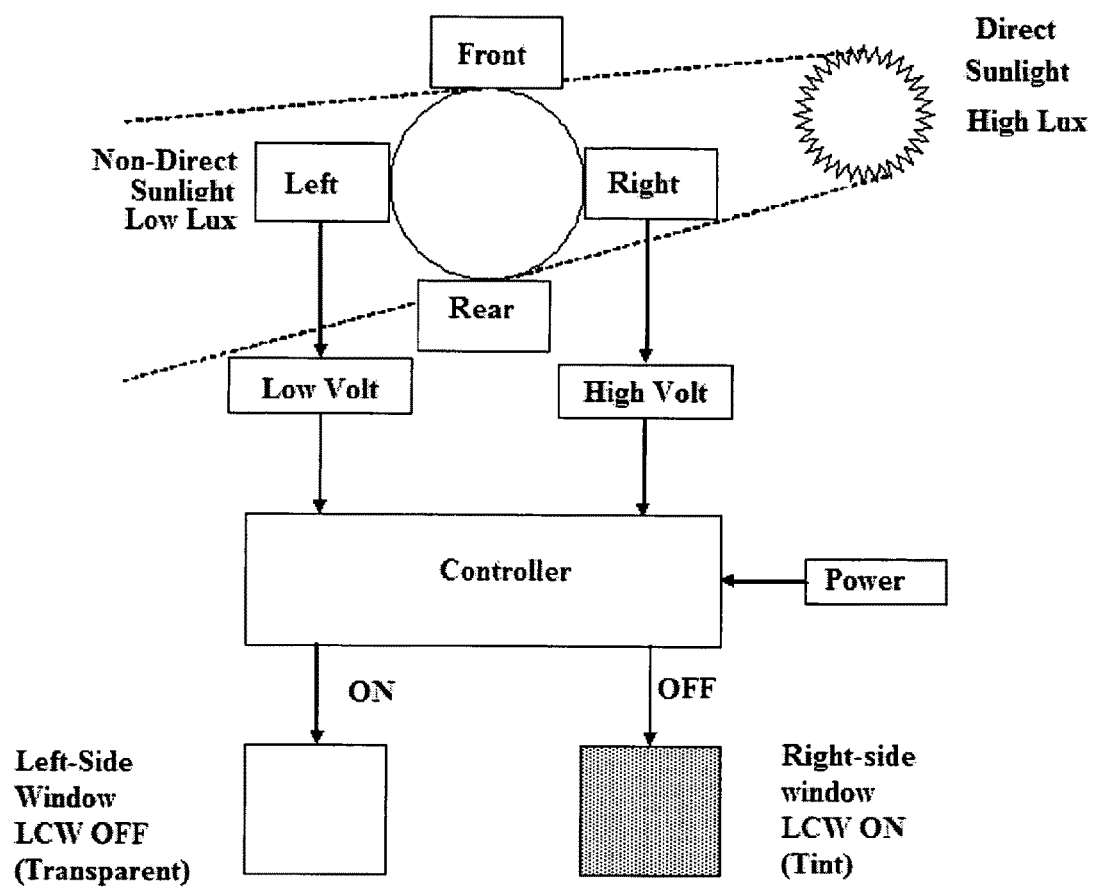
FIG. 1 is a perspective schematic representation of an automatic electronic window tinting system comprising car top-mount photocell arrangement constructed according to one embodiment of the present invention.

The present invention provides for an automatic electronic window shading system for houses, cars, RVs, busses, trains, and any situation which requires shading to protect from exposure to direct sun rays. The system comprises liquid crystal, electrochromic, suspended particle device (SPD), NanoChromics display (NCD), or Organic electroluminescent display (OELD) element attached to a part of a transparent body (such as the windows) and a electrochromic, suspended particle device (SPD), NanoChromics display (NCD), or Organic electroluminescent display (OELD) controlling semiconductor element controlling the operation of the display element.

In one embodiment, the light sensor is installed on top of the vehicle/building or any other horizontal location which allows best sun light detection and the sensors are individually shielded from vertical sun to detect sun only from sideways or at an angle. Alternative location of the light sensors (photocell or solar PV cell) may be on the sides of the vehicle or building adjacent to the window(s) to be tinted.

Variable-tint electronic windows can be controlled either automatically by means of a photocell or other light sensing or control device. They may further be adjusted by the user manually with a rheostat or digitally or electronically with remote control. For instance, a small photocell or photovoltaic cell can be used to sense the amount of sunlight, darkening the window when the sun is brightest then gradually lightening the window, as the sunlight diminishes. Darkening a window with SPD display element is done simply by adjusting the voltage to the electrodes of the window SPD layer, using a for example a rheostat, while darkening a LCW with liquid crystal display element, which can only be switched ON and OFF, is done using small pixels which can be switched ON and OFF to create patterns that provide different degrees of shading. When operated automatically, variable-tint electronic glass offers a unique way to let controlled amount the natural light in while still maintaining privacy. Almost the same amount of light passes through the window when it's tinted.

The automatic window shading system of the present invention comprises an apparatus for controlling the opacity of a liquid-crystal window, having a light detector positioned adjacent to one side of the electronic display window, and a differential amplifier/driver that compares the output of the light detector with an input control signal and generates a differential drive signal to vary the opacity of said liquid-crystal window. An analog-to-digital converting circuit converts each detecting signal out of these light sensors into a digital signal, while a digital-to-analog converting circuit converts each drive signal of these display element found by a central processing unit into an analog signal.

A voltage signal is sent to a controller which determines the direction from which the sunlight is coming. The controller, containing program logic/code, receives the voltage signal, evaluates its magnitude, then either modulates it or sends an electric AC/DC current signal to the electronic window to switch the display element (pixels) ON/OFF in a desired pre-programmed pattern to effectuate desired degree of shading using ON/OFF display switch(s) in the window according to external sun light (LUX) thus providing a selected light transmittance, and providing a thermal break for decreasing radiative and conductive heat transfer between the exterior and the interior of a building/vehicle. When the light sensor determines the sunlight direction as coming from the left of the vehicle/building it sends a signal to the controller to either send or stop an AC/DC signal (depending on the display element used) to the ON/OFF switches embedded inside the left electronic windows of the car/RV/boat or the like to switch from transparent to black thus providing an electronic shade inside the car. Furthermore, when light is low no shading is applied. When light is medium, medium shading is applied. A bias is provided to make the electronic windows less or more shady as desired by the user. When direct sun light is incident upon the light sensors shading is operated to the highest level, depending on the intensity of the incident sunlight, without complete darkness for safe driving in vehicles. Complete darkness (tinting) is allowed only during complete vehicle stop or for buildings for privacy and security.

The sensor further measures the sunlight intensity or illumination in LUX (as indicated by the voltage produced from the light sensors) and based on the preset desired light intensity (indicated by the user) the controller decides to activate only some of the display switches so that less sun blockage is provided instead of complete when there is not too much sunlight. The more the light (LUX) the higher the voltage produced by the light sensors and the more the shade changes (in patterns) to darker.

The invention further provides for manual/automatic control of the extent of shading required by providing a digital or manual offset button (or rheostat) to control the degree of comfortable sunlight exposure for the user. The offset button controls the voltage at which the system will start shading when exposed to sunlight. The sensor inside the car being an internal light sensor or the user himself and his degree of comfort.

In one embodiment, the window can be made all black when all the pixels are switched OFF. Yet in another embodiment, the entire window can be one big pixel. Just applying a small voltage and the entire window would darken (tint). It can be dimmed or brightened depending on the display technology used so it's not just ON/OFF. This might be a lower cost solution when visibility is not required like in the case of houses in contrast with automobiles. If it's just a layer of display element sandwiched between panes of glass, it would not be very expensive.

The invention further provides for controlling the shading inside the vehicle/building using pixelling to provide different degrees of shading through using sun-blocking display patterns. Liquid crystal switches can now be manufactured into fine pixels with very high resolutions of about 1280 by 768 pixels for a 12 by 9 inch window. This resolution is more than high enough to enable different patterns to be displayed on the electronic windows. Different exemplary shading patterns can be pre-programmed into the system which allow partial tinting through pixelling thus partial sun-shading without totally obstructing the view to the outside of the vehicle and further allowing control of the degree of lighting and heat inside the house/vehicle. In circular patterns for example the size of the circles can be controlled to be smaller or larger to provide darker of lighter shades. It can also be controlled to change in size from top to bottom to provide gradual shading from top to bottom such as for the front shield where darker pattern is desirable closer to the top of the windshield. The liquid crystal panel is divided in plural stages oriented horizontally and an automatic and/or a manual controller is provided so as to signal the display element (liquid crystal) panels to control shading the sun light starting at the higher side of the correspondent display element (liquid crystal) panel and moving downward. According to the present invention, it is possible to tint only half a window such as the windshield for safe driving or tint the whole passenger and driver windows with allowance to see the reflection of the rear view mirrors, and further can manually change the height of the tinting in the front window to suit individual drivers heights, using rheostat or digitally. As such no extra accessory are required for blocking sun light in the building/vehicle. Level of tint is always adjustable depending upon outside weather. Every window will be operated independently by users/passengers. The new electronic windows allows blocking of sunlight without curtains or blinds, the particles that block light from the outside would also block light from the inside, so the privacy one expects would still exist.

The power required for the controller to run the logic and more importantly to send a modulated signal to the ON/OFF LCW switches can be supplied by the automobile or alternatively by a solar energy or a battery.

According to the present invention, the light sensing element may be a photocell or a photovoltaic cell or any light sensor used for detecting the intensity of direct sunlight. Light sensors produces electrical energy (signal) the strength of which depends on the intensity of the incident sun rays. This signal tells the controller to shade the corresponding window with a pattern that provides more shading to the vehicle/building interior corresponding to the intensity of the signal or sun rays.

In one embodiment, Optoelectronic's Photocell or Light-Dependent Resistor can provide a very economical and technically superior solution for the purpose of the present invention where the presence or absence of light is sensed (digital operation) or where the intensity of light is to be measured (analog operation). The semiconductor light detectors may be junction or bulk-effect devices. Junction devices, such as Silicon photodiodes for example, when operated in the photoconductive mode, utilize the reverse characteristic of a PN junction. Under reverse bias, the PN junction acts as a light-controlled current source. Output is proportional to incident illumination and is relatively independent of applied voltage. On the other hand bulk-effect photoconductors (photoconductive cells or, simply, photocells) have no junction. The bulk resistivity decreases with increasing illumination, allowing more photocurrent to flow. This resistive characteristic gives bulk-effect photoconductors a unique quality: signal current from the detector can be varied over a wide range by adjusting the applied voltage.

Photocell sensors have lowest-cost visible detector, are available in low-cost plastic-encapsulated packages as well as hermetic packages, are responsive to both very low light levels (moonlight) and to very high light levels (direct sunlight), have wide dynamic range: resistance changes of several orders of magnitude between "light" and "no light", low noise distortion, have maximum operating voltages of 50 to 400 volts which is suitable for operation on 120/240 VAC, are available in center-tap dual-cell configurations as well as specially selected resistance ranges for special applications, are easy to use in DC or AC circuits, are available in a wide range of resistance values, and are usable with almost any visible or near-infrared light source such as LEDs; neon; fluorescent, incandescent bulbs, lasers; flame sources; sunlight; etc.

In another embodiment, a conventional solar cell, photovoltaic cell (PV cell) made from a monocrystalline silicon wafer, for example, may be used for the purpose of this invention. Photo voltaic (PV) cell produces electrical energy (signal) the strength of which depends on the intensity of the sun rays.

Light sensors are a growing field, and there are new and improved light sensors popping up. For the most part, these sensors are all built around the same basic structure. Any other light sensing element and installation technique may be used for the purpose of the present invention.

Description Of Preferred Embodiments

The above and other aspects, features, and advantages of the present invention will be better and more fully understood by reference to the following detailed and more particular description of the invention, which is provided to further define the invention and are in no way meant to limit the scope of the invention to the particulars of these examples.

Figure 2:
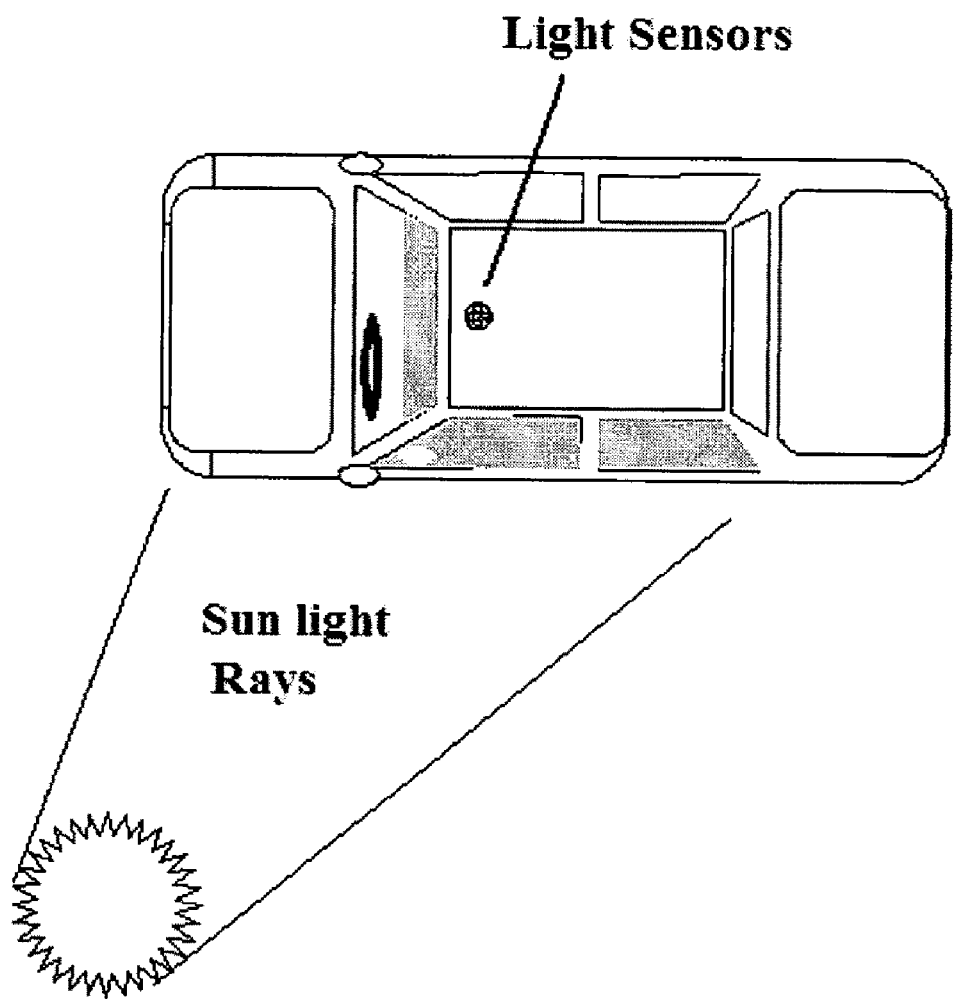
FIG. 2 is a perspective schematic representation of an automatic electronic window tinting system comprising car top-mount photocell arrangement according to one embodiment of the invention within its environment.

In one embodiment of the present invention by referring to the accompanying drawings and in particular to FIG. 1, an automatic electronic window tinting system in a transport vehicle with top-mount photocell unit comprises a four photocell arrangement (front, rear, right, and left), a control console with a control console with a controlling semiconductor element, an electronic drive system, a central processing unit and power supply, a rheostat, liquid crystal, electrochromic, suspended particle device (SPD), or NanoChromics display (NCD) element attached to a part of the windows, and a liquid crystal, electrochromic, suspended particle device (SPD), or NanoChromics display (NCD) controlling semiconductor element controlling the operation of the a liquid crystal, electrochromic, suspended particle device (SPD), or NanoChromics display (NCD) element. When direct sunlight is projecting from the right side of a moving vehicle it is detected by all photocells at the same time with the photocell in the right producing higher voltage being directly facing the sunrays. All signals are read by the controller which interprets the higher signal (higher than a user adjustable pre-specified value) from the right light sensor (photo sensor or PV sensor) as being the direction of the sunrays. The controller sends an AC current to the right-side windows of the transportation vehicle to have them tinted by impressing voltage between a positive electrode and a negative electrode controlled by display driver. When liquid crystal windows are used then the controller stops the electric signal to the right-side windows of the transportation vehicle to have them tinted, while sending an electric current to the other windows to keep them clear for safe driving. When the car makes a U-turn for example and the sun is now on the right side. This is detected by left-side sensor which sends a higher voltage current (than the other sensors) to the controller which interprets this high voltage (and the lower voltage from the other sensors) as the sun being on the left side. The controller send a current to all the windows to turn the LC switches ON to make them transparent while stopping the signal to the left-side window to turn its LC switches OFF and the left-side window becomes tinted. When both left and front sensors send high voltage signal (higher than the user pre-specified value) then this would be interpreted by the controller as the transport vehicle being exposed to the sun from a front-left angle and both left-side and front windows are tinted as illustrated in FIG. 2. The user pre-specified voltage value may be lowered down to zero in order to make all the windows darken (tinted) even when there is little or no sunlight available, such as during the night, for privacy and security. Any number of photocells may be used for the purpose of the present invention depending on the intended application and number of windows.

In another embodiment of the present invention also by referring to the accompanying drawings and in particular to FIG. 1, an automatic electronic window tinting system in a transport vehicle with top-mount photocell unit comprises a four photocell arrangement (front, rear, right, and left), a control console with a controlling semiconductor element, an electronic drive system, a central processing unit and power supply, a rheostat, electrochromic display element attached to a part of the windows, and an electrochromic display controlling semiconductor element controlling the operation of the electrochromic display element. When direct sunlight is projecting from the right side of a moving vehicle it is detected by all photocells at the same time with the photocell in the right producing higher voltage being directly facing the sunrays. All signals are read by the controller which interprets the higher signal (higher than a user adjustable pre-specified value) from the right-side light sensor as being the direction of the sunrays. The controller sends an AC current to the right-side electrochromic windows of the transportation vehicle to have them tinted, while reversing the voltage polarity to the other windows to keep them clear for safe driving (unless overridden by the user for privacy). When the car makes a U-turn for example and the sun is now on the right side. This is detected by left-side sensor which sends a higher voltage current (than the other sensors) to the controller which interprets this high voltage (and the lower voltage from the other sensors) as the sun being on the left side. The controller reverses the voltage polarity to all the windows to turn the electrochromic display switches OFF to make them transparent while reversing current to the left-side window to turn its electrochromic switches ON and the left-side window becomes tinted. When both left and front sensors send high voltage signal (higher than the user pre-specified value) then this would be interpreted by the controller as the transport vehicle being exposed to the sun from a front-left angle and both left-side and front windows are tinted as illustrated in FIG. 2. The user pre-specified voltage value may be lowered down to zero in order to make all the windows darken (tinted) even when there is little or no sunlight available such as during the night for privacy and security.

In yet another embodiment of the present invention also by referring to the accompanying drawings and in particular to FIG. 1, an automatic electronic window tinting system in a transport vehicle with top-mount photocell unit comprises a four photocell arrangement (front, rear, right, and left), a control console with a controlling semiconductor element, an electronic drive system, a central processing unit and power supply, a rheostat, suspended particle display (SPD) element attached to a part of the windows, and an SPD controlling semiconductor element controlling the operation of the SPD element. When direct sunlight is projecting from the right side of a moving vehicle it is detected by all photocells at the same time with the photocell in the right producing higher voltage being directly facing the sunrays. All signals are read by the controller which interprets the higher signal (higher than a user adjustable pre-specified value) from the right light sensor as being the direction of the sunrays. The controller reduces the electric current to the right-side SPD windows of the transportation vehicle to have them tinted, while increasing the electric current to the other windows to keep them clear for safe driving. When the car makes a U-turn for example and the sun is now on the right side. This is detected by left-side sensor which sends a higher voltage current (than the other sensors) to the controller which interprets this high voltage (and the lower voltage from the other sensors) as the sun being on the left side. The controller increases the current to all the windows to turn the SPD display switches ON to make them transparent while reducing the current to the left-side window to turn its SPD switches OFF and the left-side window becomes tinted. When both left and front sensors send high voltage signal (higher than the user pre-specified value) then this would be interpreted by the controller as the transport vehicle being exposed to the sun from a front-left angle and both left-side and front windows are tinted as illustrated in FIG. 2. The user pre-specified voltage value may be lowered down to zero in order to make all the windows darken (tint) even when there is little or no sunlight available such as during the night for privacy and security. SPD can be adjusted manually with a rheostat or remote control by the user not through using pixelling and pre-programmed patterns but by making the display more or less transparent by applying more or less current to the SPD windows.

In yet another embodiment of the present invention by referring to the accompanying drawings and in particular to FIG. 1, an automatic electronic window tinting system in a transport vehicle with top-mount photocell unit comprises a four photocell arrangement (front, rear, right, and left), a control console with a controlling semiconductor element, an electronic drive system, a central processing unit and power supply, a rheostat, NanoChromics Display (NCD) element attached to a part of the windows, and an NCD controlling semiconductor element controlling the operation of the NCD element. When direct sunlight is projecting from the right side of a moving vehicle it is detected by all photocells at the same time with the photocell in the right producing higher voltage being directly facing the sunrays. All signals are read by the controller which interprets the higher signal (higher than a user adjustable pre-specified value) from the right light sensor as being the direction of the sunrays. The controller sends an electric signal to the right-side NCD windows of the transportation vehicle to have them tinted, while reversing the voltage polarity to the other windows (if they are already tinted) to keep them clear for safe driving. When the car makes a U-turn for example and the sun is now on the right side. This is detected by left-side sensor which sends a higher voltage current (than the other sensors) to the controller which interprets this high voltage (and the lower voltage from the other sensors) as the sun being on the left side. The controller reverses the voltage polarity to all the windows to turn the NCD switches OFF to make them transparent while reversing current to the left-side window to turn its NCD ON and the left-side window becomes tinted. When both left and front sensors send high voltage signal (higher than the user pre-specified value) then this would be interpreted by the controller as the transport vehicle being exposed to the sun from a front-left angle and both left-side and front windows are tinted as illustrated in FIG. 2. The user pre-specified voltage value may be lowered down to zero in order to make all the windows darken (tinted) even when there is little or no sunlight available such as during the night for privacy and security.

Figure 5:
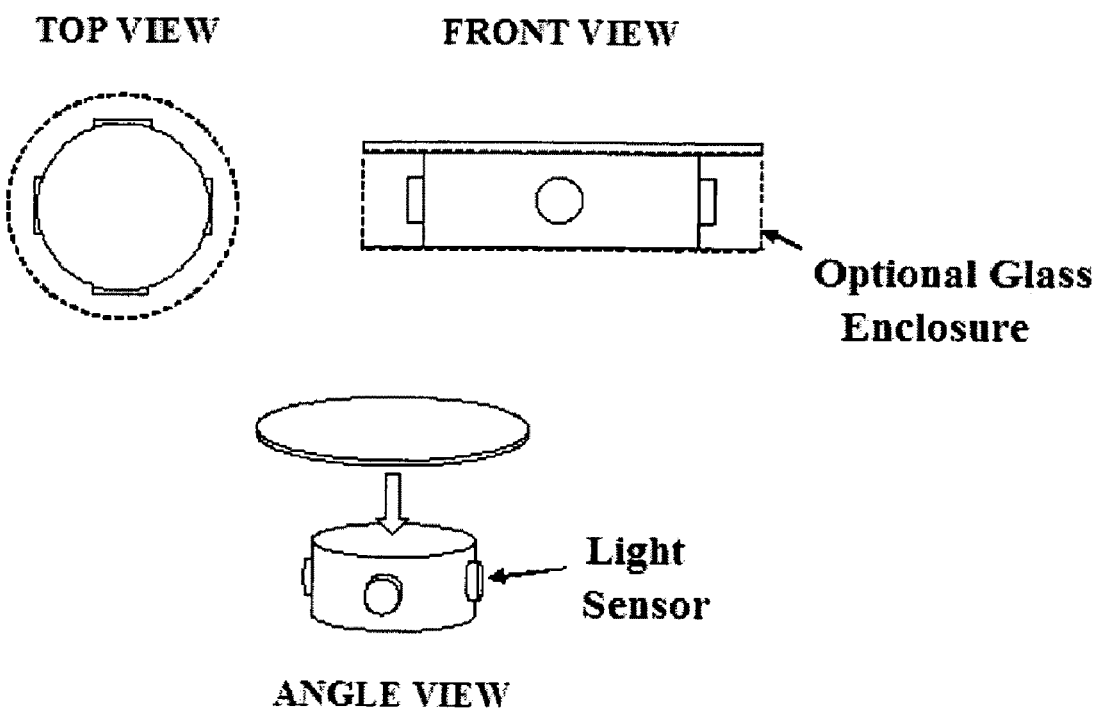
FIG. 5 is a perspective schematic representation of a top, front, and angle view of a car top-mount photocell arrangement for an automatic electronic window tinting system constructed according to one embodiment of the present invention.
Figure 6:
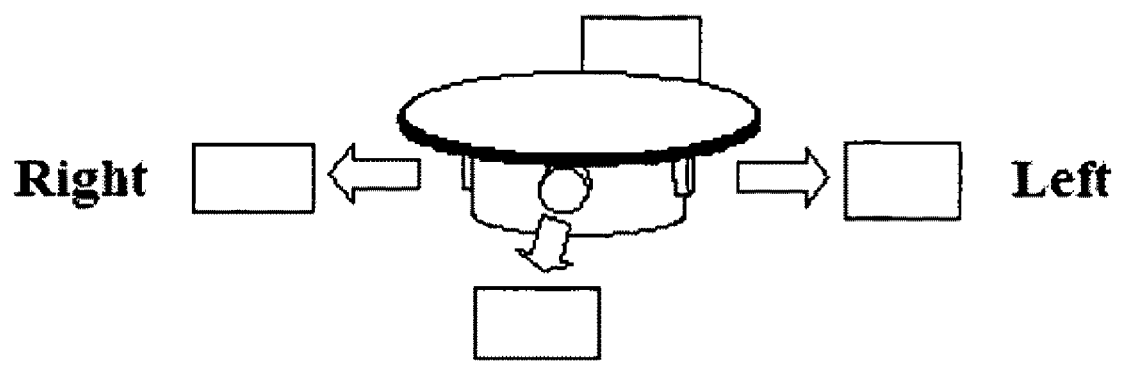
FIG. 6 is a perspective schematic representation of a car top-mount photocell arrangement comprising front, rear, left, and right side photocells for an automatic electronic window tinting system constructed according to one embodiment of the present invention.

In one embodiment of the present invention, also by referring to the accompanying drawings and in particular to FIGS. 5 and 6, an automatic electronic window tinting system in a building/vehicle comprises a top-mount light sensing element comprising disk shaped member on the side of which there is evenly spaced and fixedly supported four light sensing elements or photocells to detect the incident sunlight from four different directions termed herein for convenience front-side, rear-side, left-side, and right-side. On top of this aforementioned arrangement there is placed a thin disk of larger diameter than the supporting disk below to shield and provide shading for the light sensors below to prevent the vertical sunlight from being detected by the light sensors thereby allowing only the sunlight incident with an angle or sideways to be detected for further action. A glass enclosure may optionally be used to protect the sensing element from the weather conditions.

Figure 25:
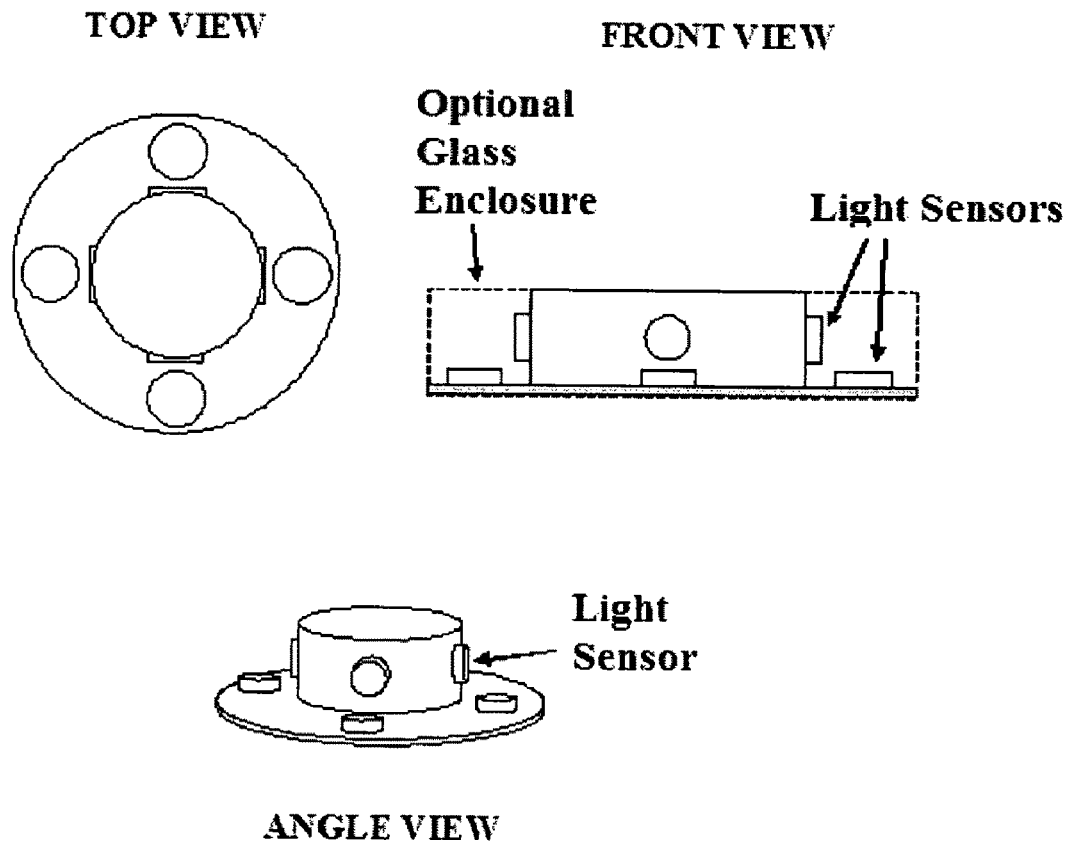
FIG. 25 is a perspective schematic representation of a top, front, and angle view of a car top-mount photocell arrangement for an automatic electronic window tinting system constructed according to another embodiment of the present invention.
Figure 26:
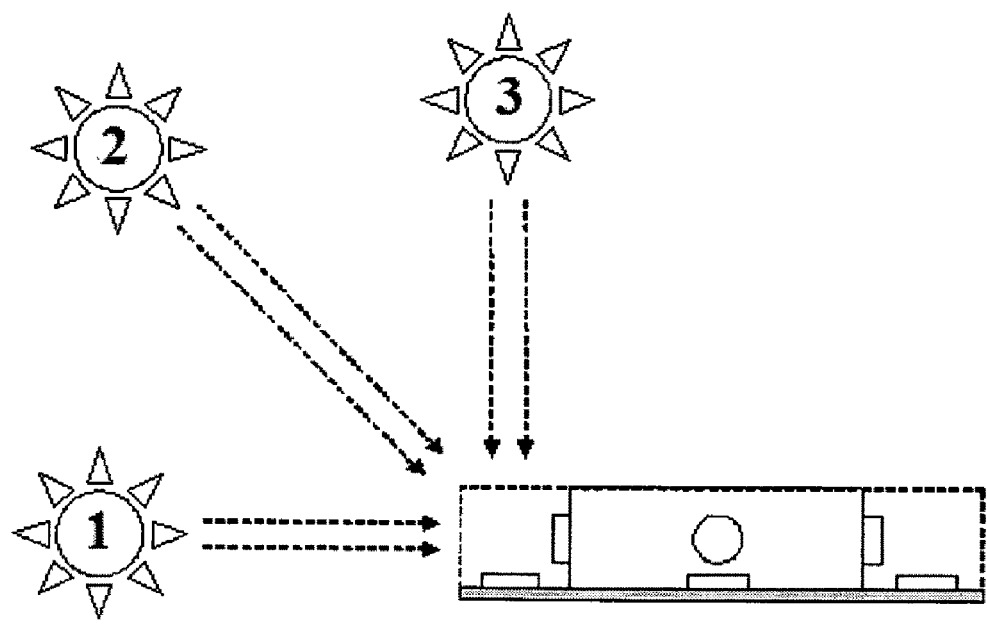
FIG. 26 is a perspective schematic representation of a car top-mount photocell dual vertical/horizontal arrangement for an automatic electronic window tinting system constructed according to one embodiment of the present invention.

Yet in another embodiment of the present invention, also by referring to the accompanying drawings and in particular to FIG. 25, an automatic electronic window tinting system in a building/vehicle comprises a top-mount light sensing element comprising disk shaped member on the side of which there is evenly spaced and fixedly supported four vertically oriented light sensing elements or photocells to detect the incident sunlight from four different directions termed herein for convenience front-side, rear-side, left-side, and right-side. On the bottom of this aforementioned arrangement there is placed a thin disk of larger diameter on top of which there is evenly spaced and fixedly supported four horizontally oriented light sensing elements or photocells aligned with the vertical photocells to detect the incident sunlight from the aforementioned four different directions. This dual vertical/horizontal photocell arrangement enables the detection of angle of the incident sunlight thereby allowing only the sunlight incident with an angle or sideways to be detected for further action. A glass enclosure may optionally be used to protect the sensing element from the weather conditions. FIG. 26 shows this dual vertical/horizontal photocell arrangement in action. In the morning when the sunrays are incident on the photocell from the side (location 1), the vertical photocell detects a higher LUX and reports a correspondingly higher voltage than the horizontal photocell. This is interpreted by the controller that the sunrays are incident from the side and action is taken to darken the windows accordingly. When both vertical and horizontal photocells report the same voltage this is interpreted by controller as the sun being at a 45-degree angle from the (vehicle/building) top photocell arrangement (location 2) and again action is taken to darken the windows accordingly. When the horizontal photocell reports maximum voltage and the vertical photocell reports minimum voltage this is interpreted by controller as the sun being vertical (location 3) and action is taken to clear or brighten the windows. Darkening the windows again can be invoked by the controller upon detection of sunlight incident with a specific desired angle.

Figure 3:
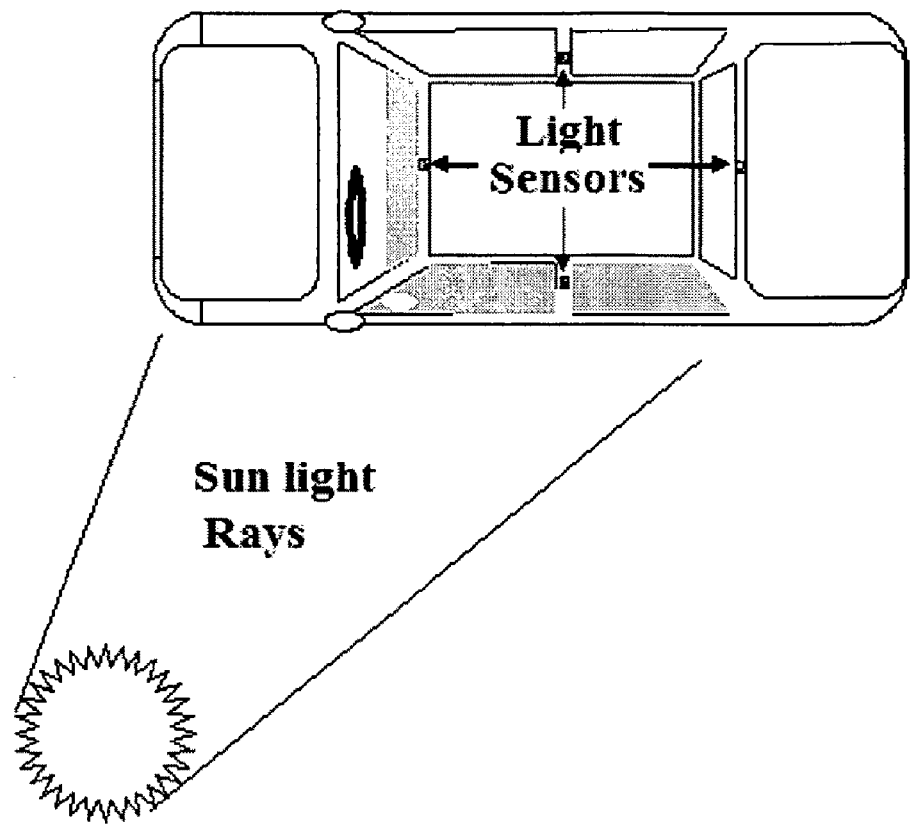
FIG. 3 is a perspective schematic representation of an automatic electronic window tinting system comprising an alternative car side-mount photocell arrangement according to one embodiment of the invention within its environment.
Figure 9:
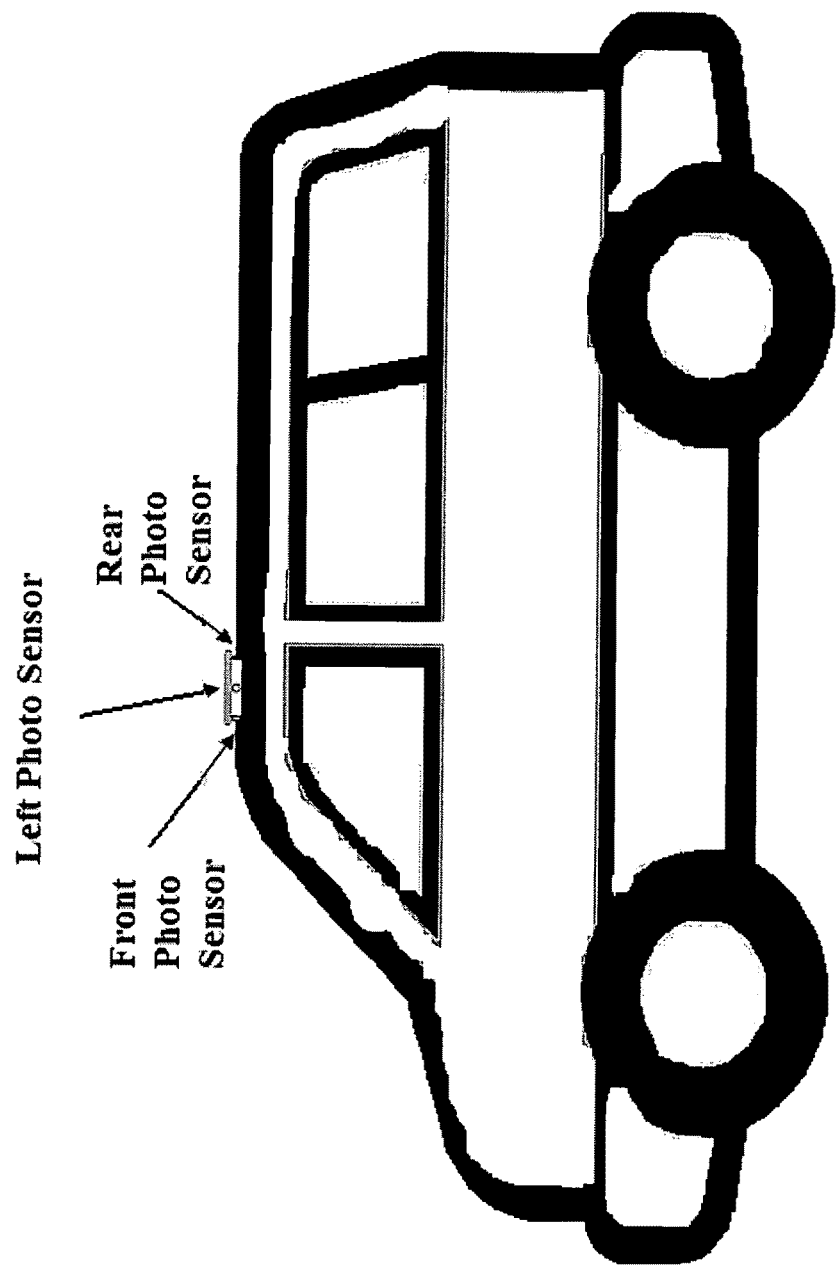
FIG. 9 is a perspective schematic representation of an automatic electronic window tinting system according to one embodiment of the invention within its environment comprising car top-mount four photocell arrangement.
Figure 10:
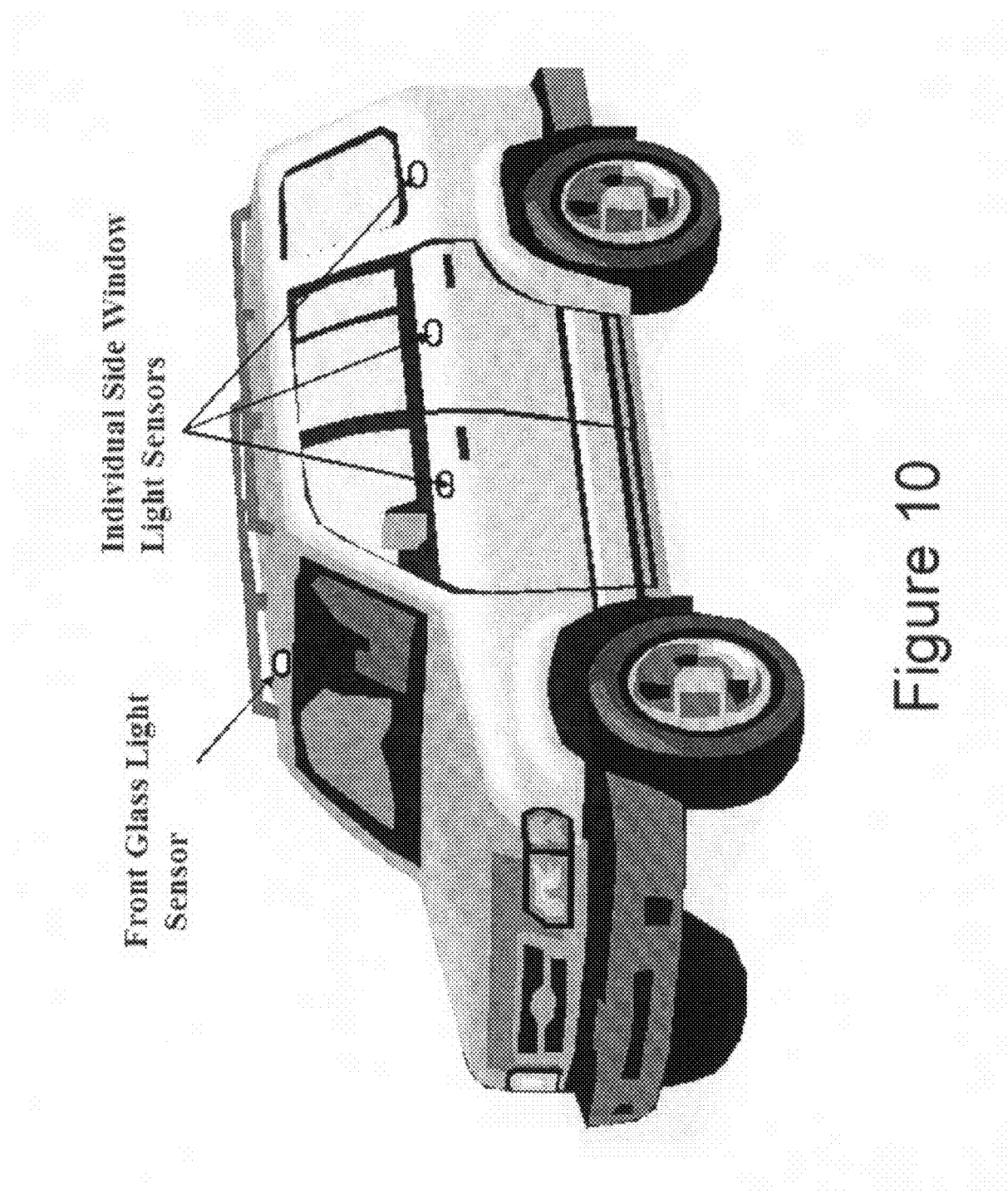
FIG. 10 is a perspective schematic representation of an automatic electronic window tinting system of the invention within its environment comprising a car side-mount photocell or photovoltaic (solar) cell arrangement for individual windows.
Figure 11:
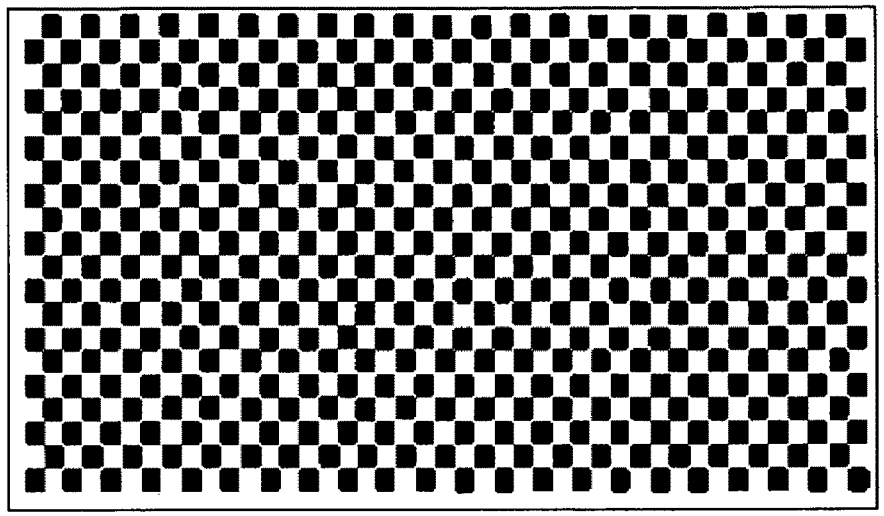
FIGS. 11 to 14 illustrate perspective schematic representation close-ups of different exemplary shading patterns which allow partial tinting through pixelling thus partial sun-shading without totally obstructing the view to the outside of the vehicle and further allowing control of the degree of lighting and heat inside the house/vehicle; and, FIGS. 15 to 22 Illustrate perspective schematic representation of the different exemplary shading patterns which allow partial tinting through pixelling thus partial sun-shading without totally obstructing the view to the outside of the vehicle and further allowing control of the degree of lighting and heat inside the house/vehicle.
Figure 11:
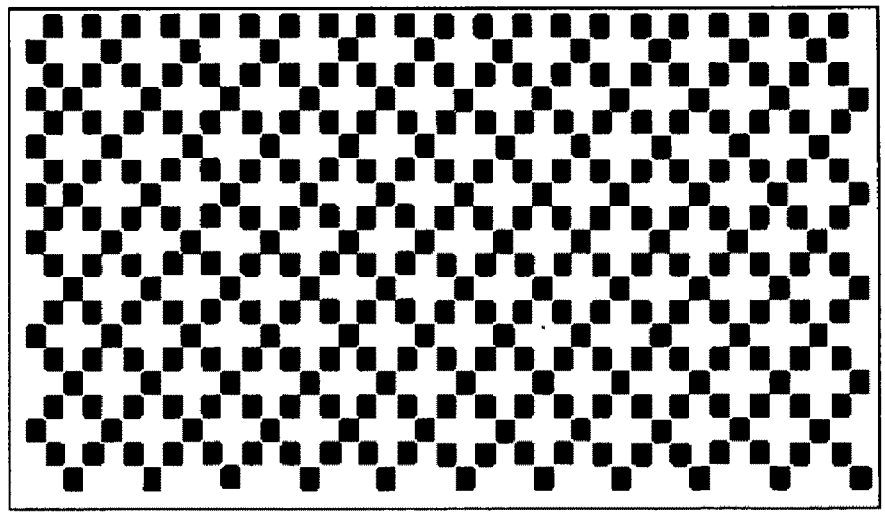
Figure 12:
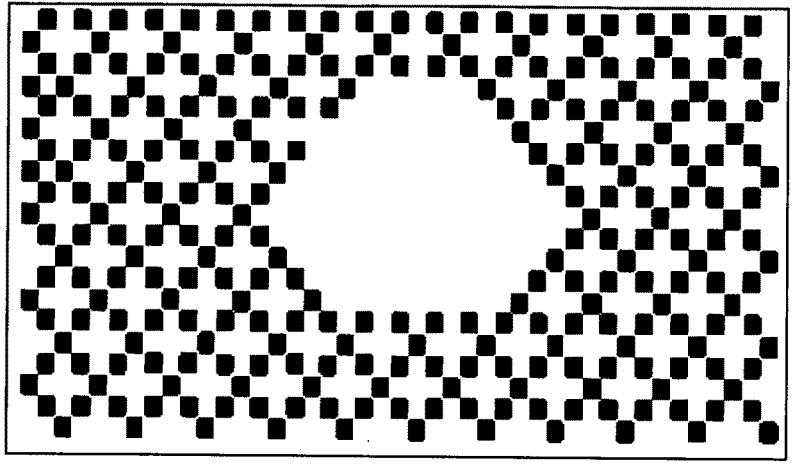
Figure 12:
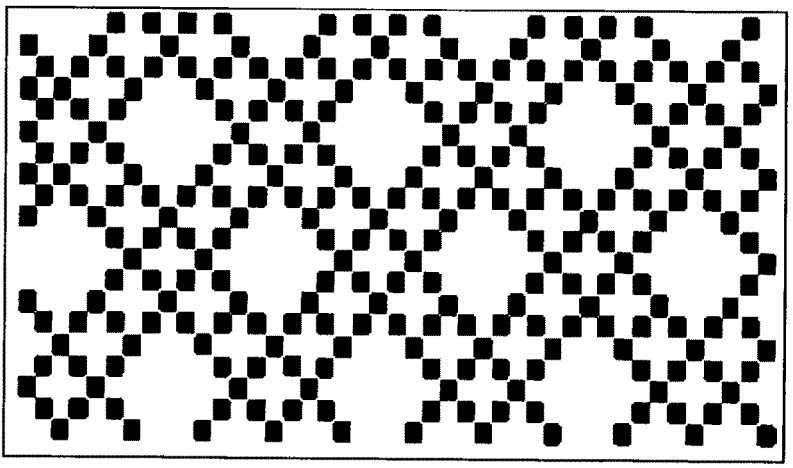
Figure 13:
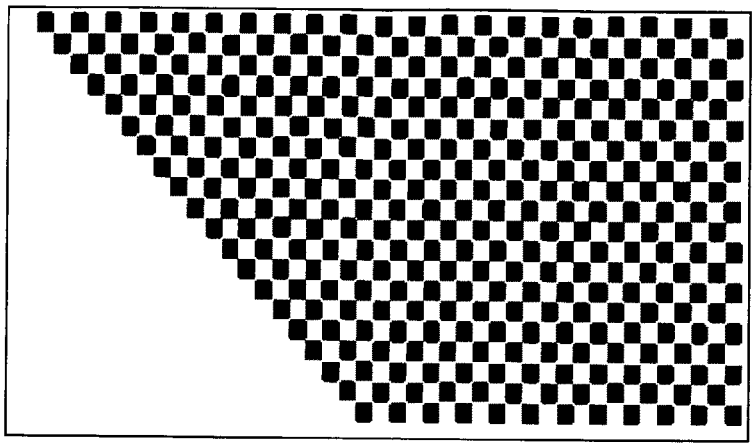
Figure 13:
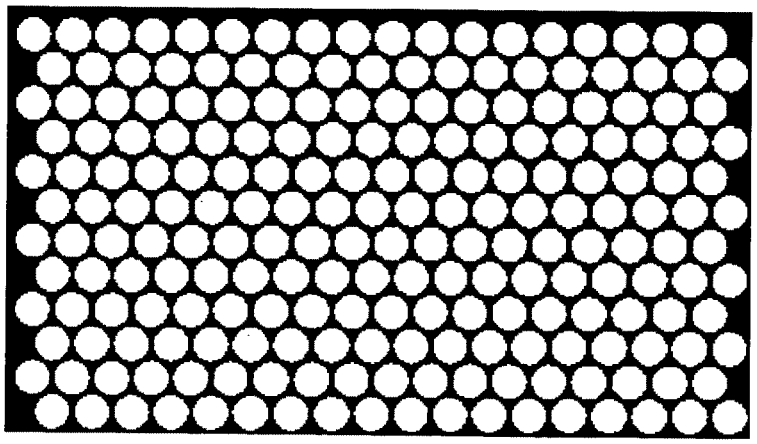
Figure 14:
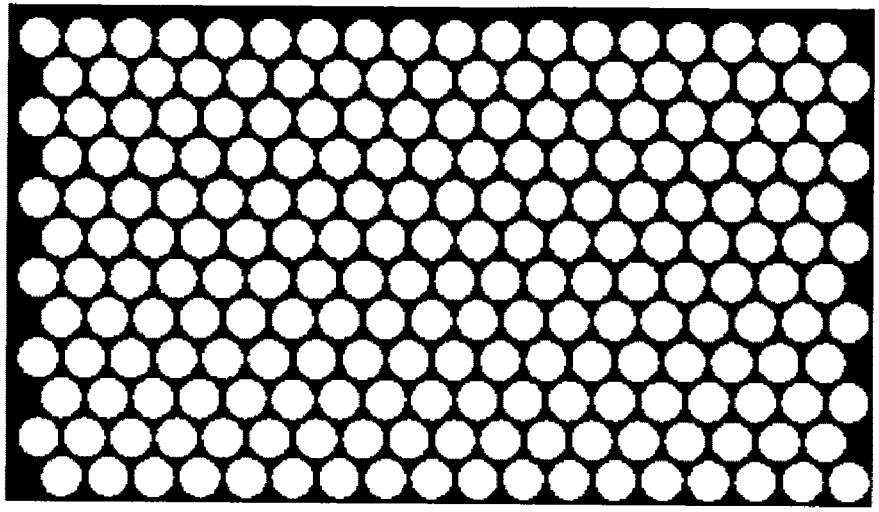
Figure 14:
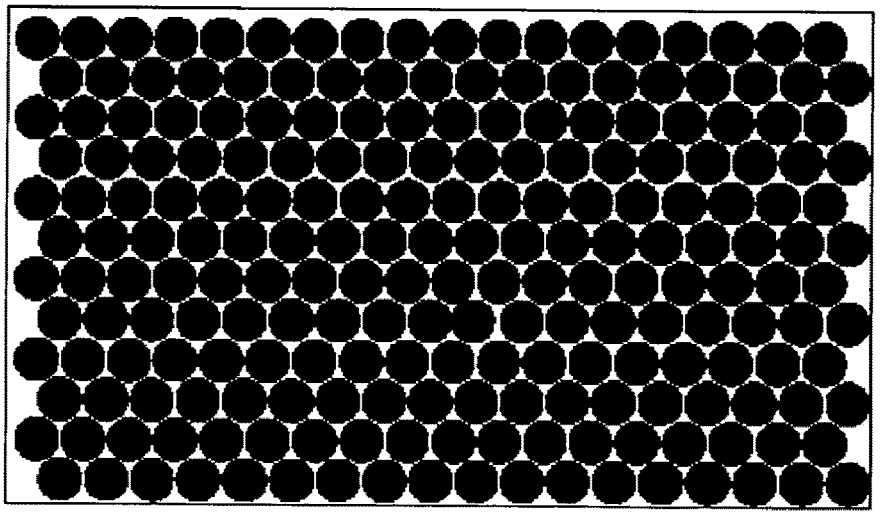
Figure 15:
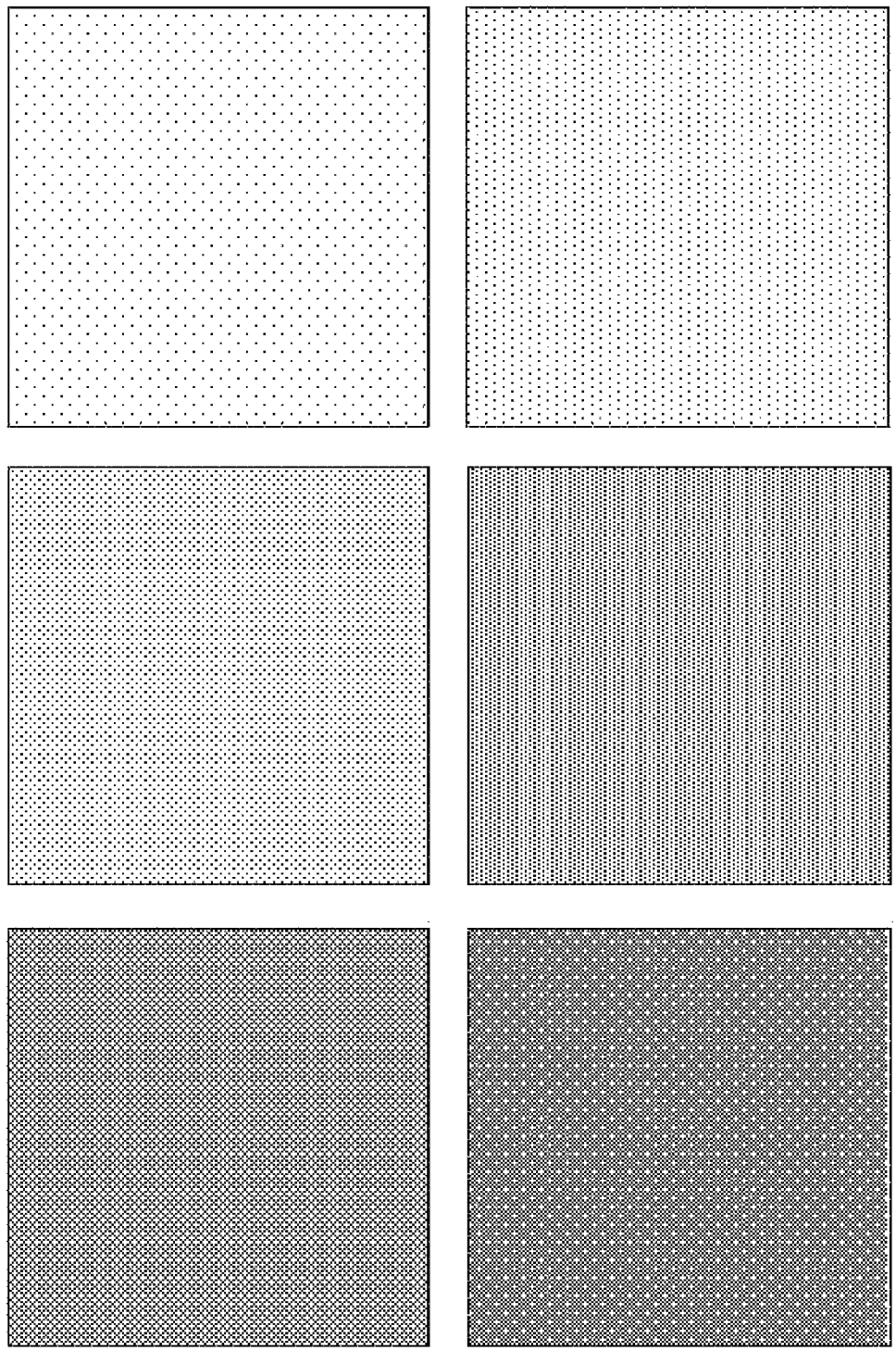
Figure 16:
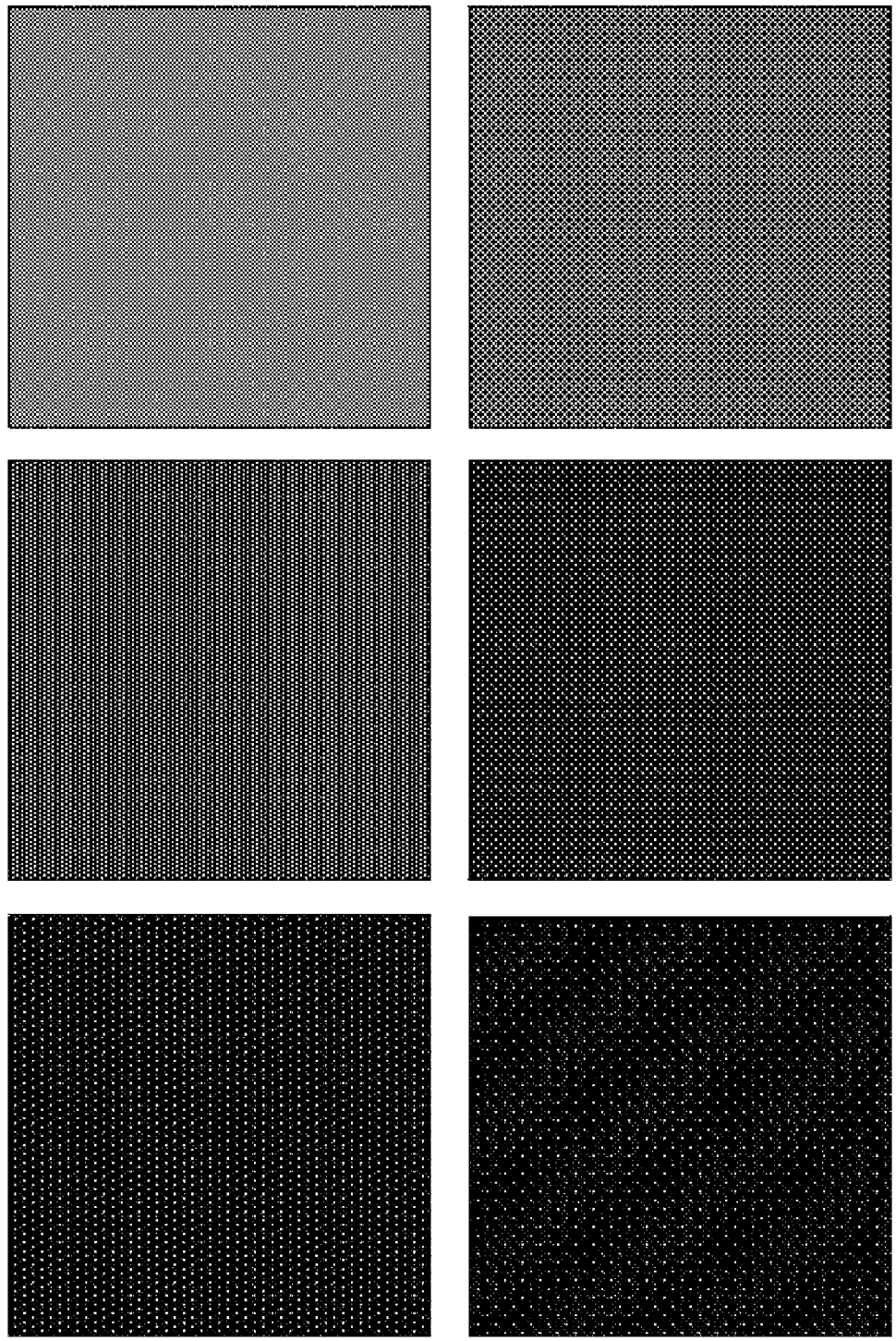
Figure 17:
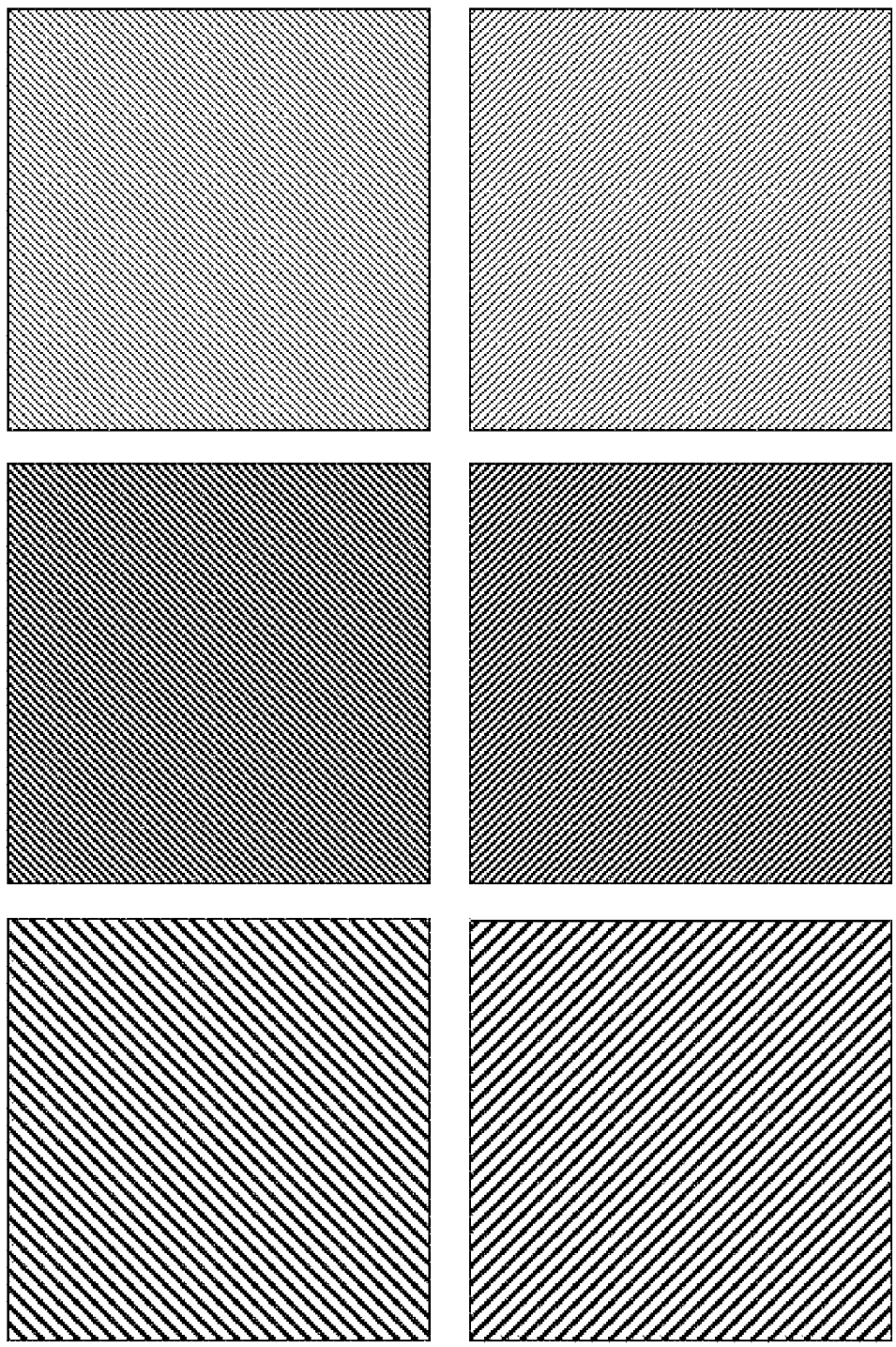
Figure 18:
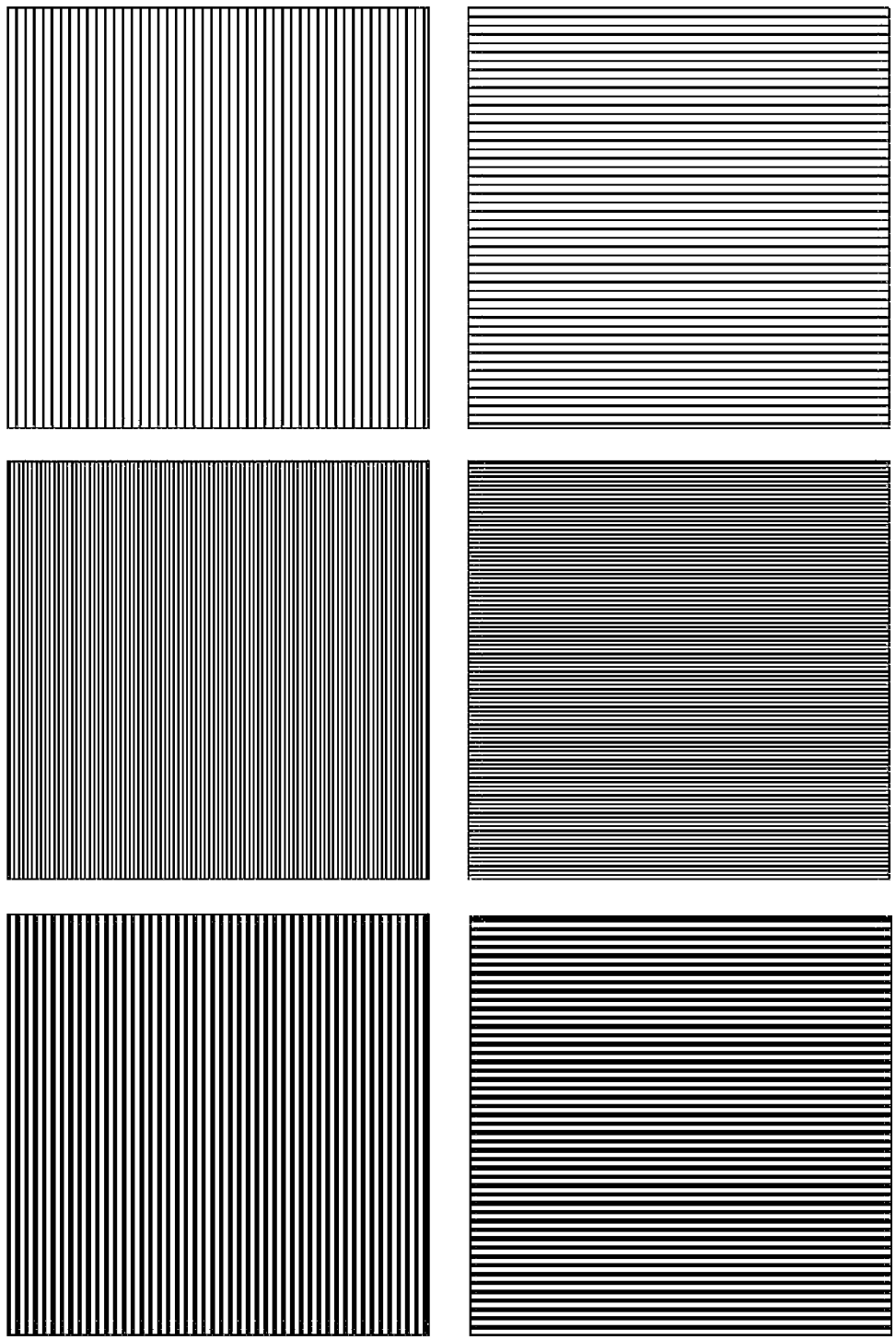
Figure 19:
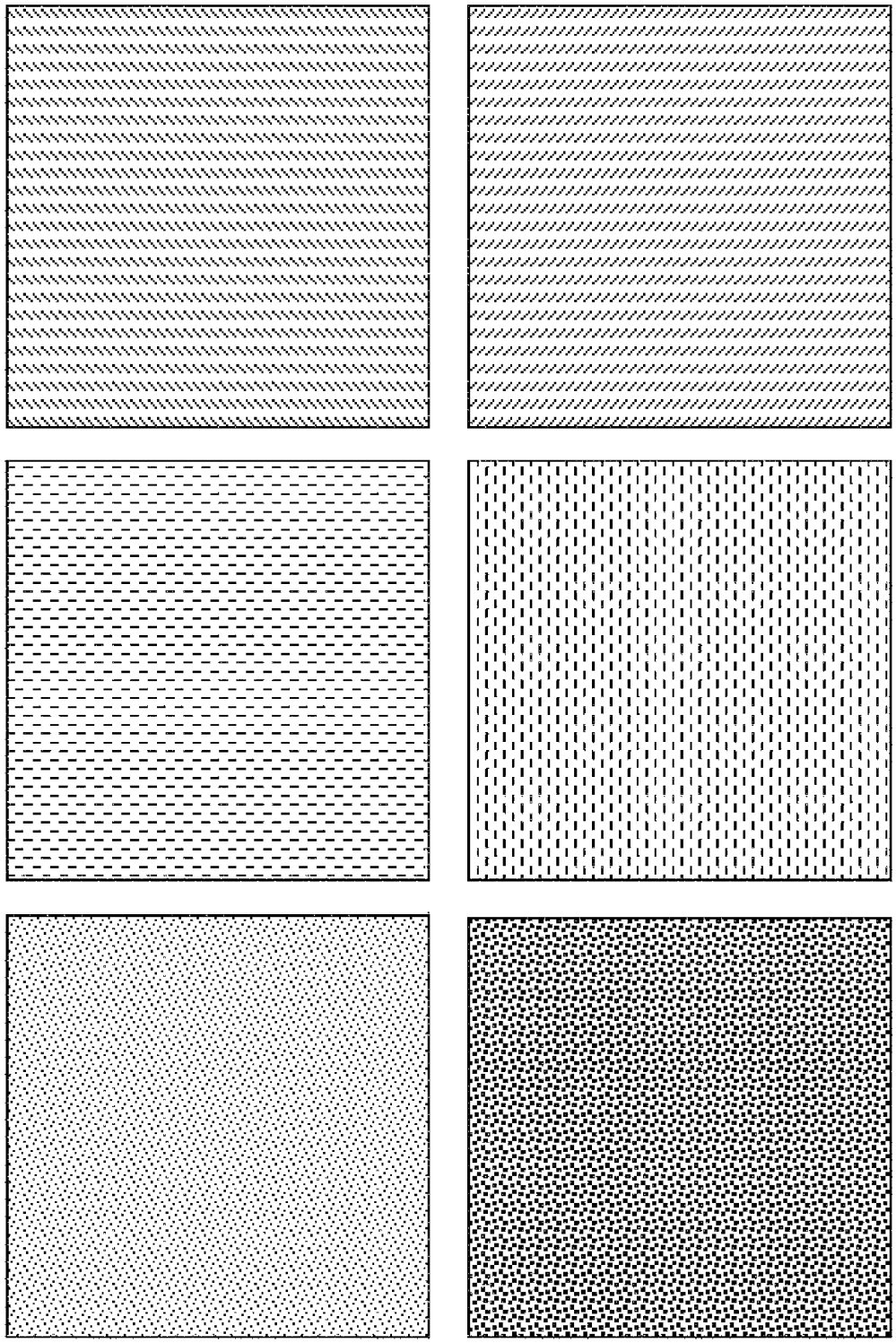
Figure 20:
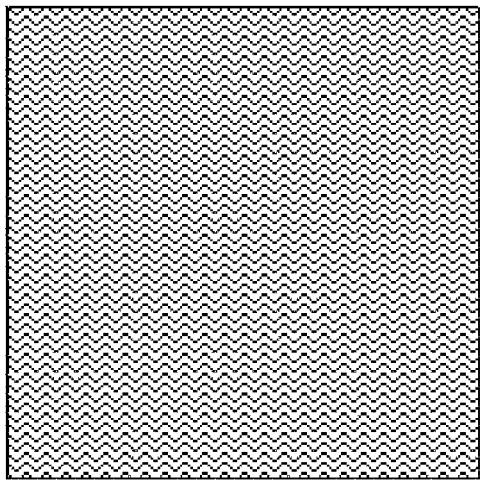
Figure 20:
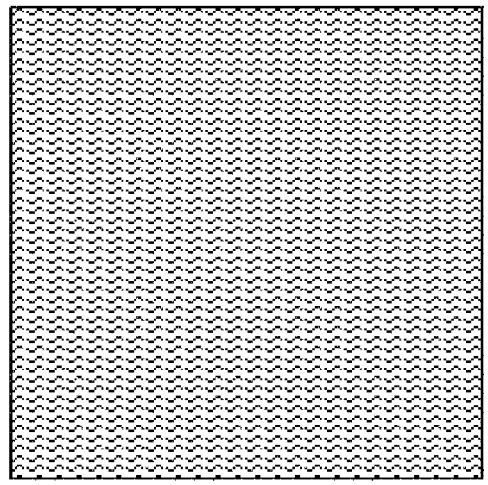
Figure 20:
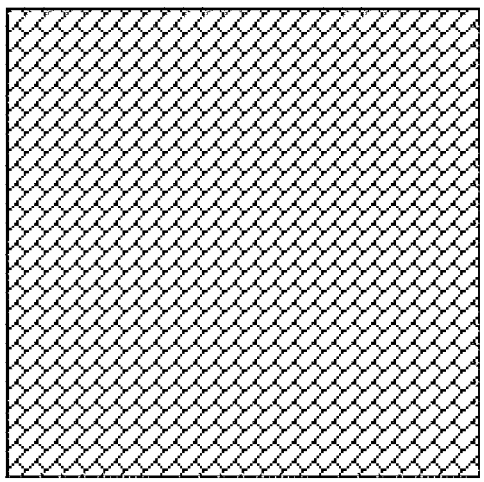
Figure 20:
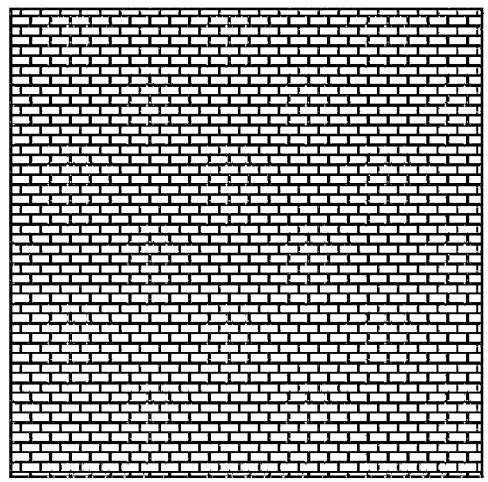
Figure 20:
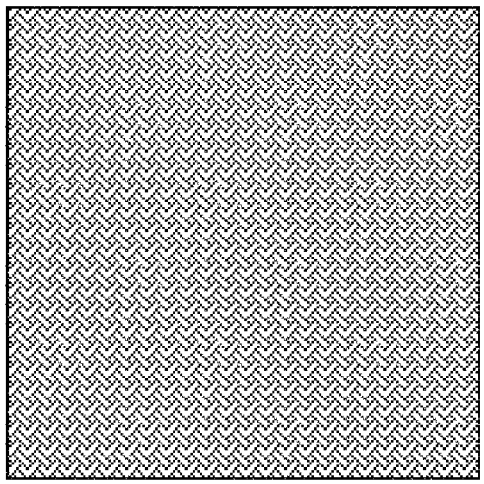
Figure 20:
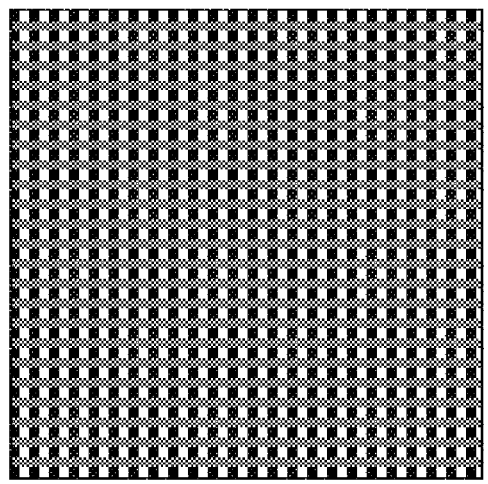
Figure 21:
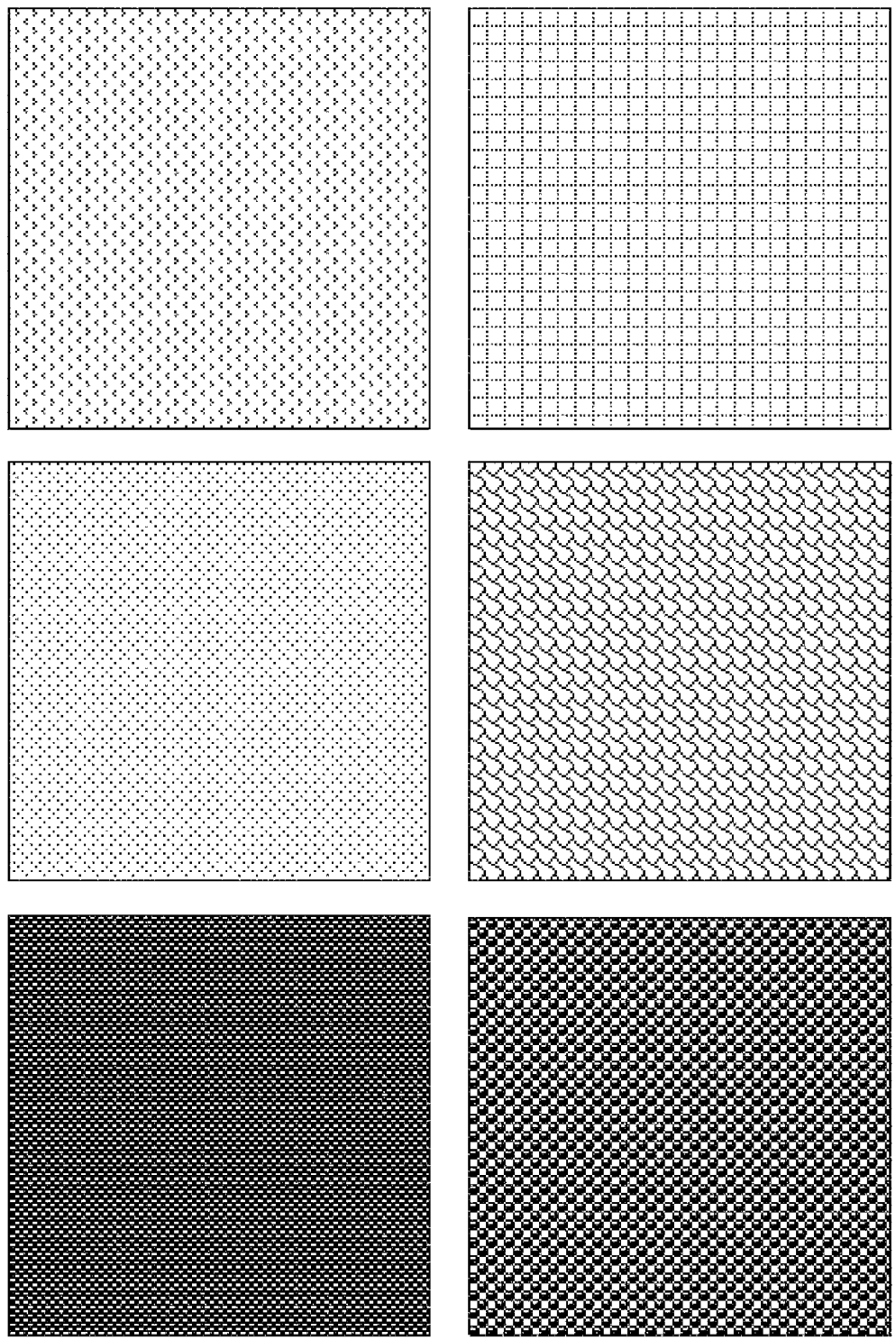
Figure 22:
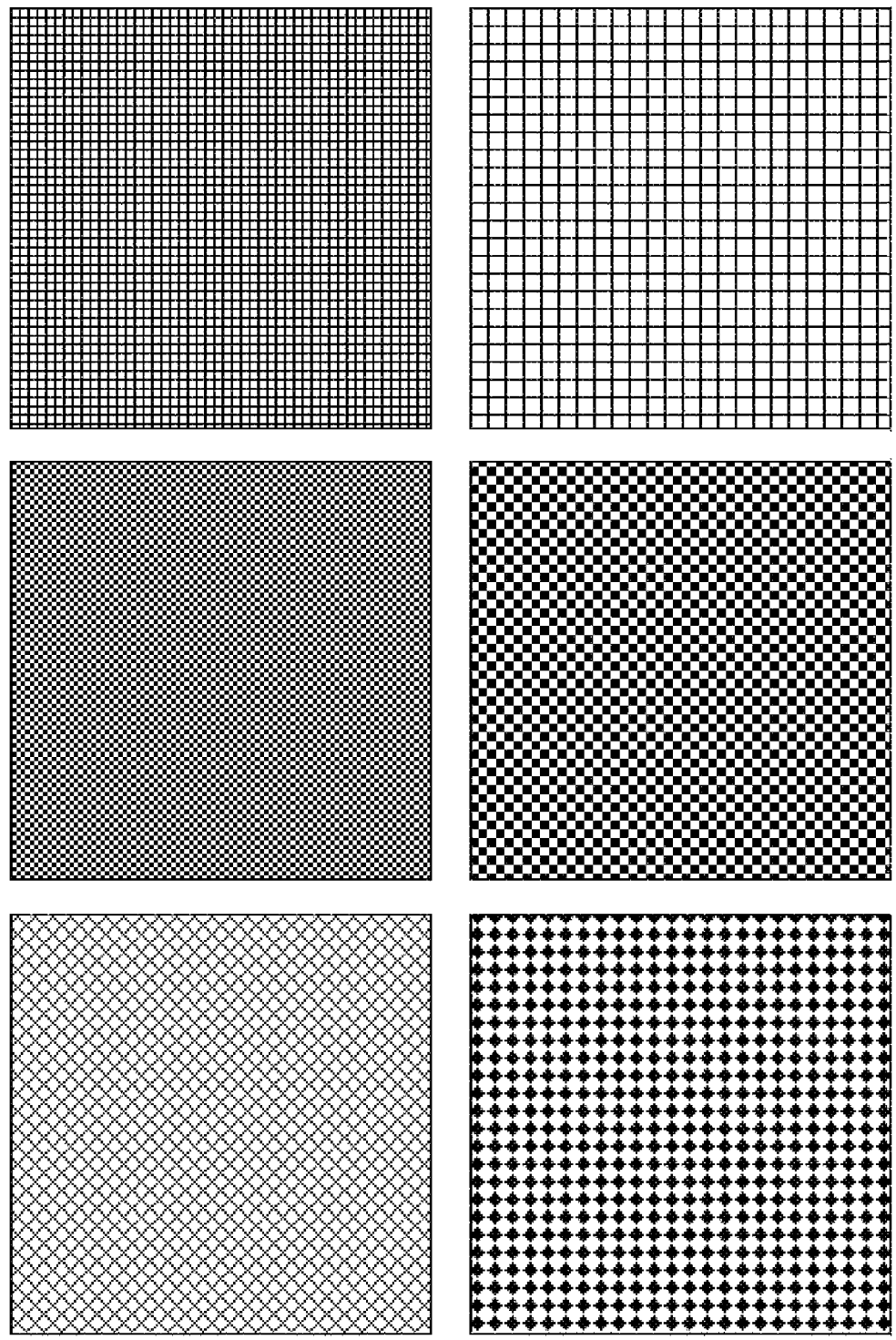

In a second embodiment of the present invention also by referring to the accompanying drawings and in particular to FIGS. 3 and 10, an automatic electronic window tinting system in a transport vehicle comprises a photocell unit for each window placed beside each window. FIG. 3 shows an automobile having six windows with an automatic electronic window tinting system comprising four photocells. The right and left side photocells control two side windows, each. FIG. 9 shows an automobile having six windows with an automatic electronic window tinting system comprising six side-mounted photocells. The display on each individual window may be adjusted electronically by the controller to be darker (tinted) according to a pre-specified voltage value adjustable by the user for each window, to provide comfort for each individual passenger as desired. The pre-specified voltage value (Set Point) may be supplied by the user for the entire windows or each individual window manually using a rheostat or electronically. The system is capable of automatic or manual override/switching as desired to enable or effectuate complete tinting such as during parking and when privacy is desired or to disable tinting for completely clear windows such as during driving.

Figure 7:
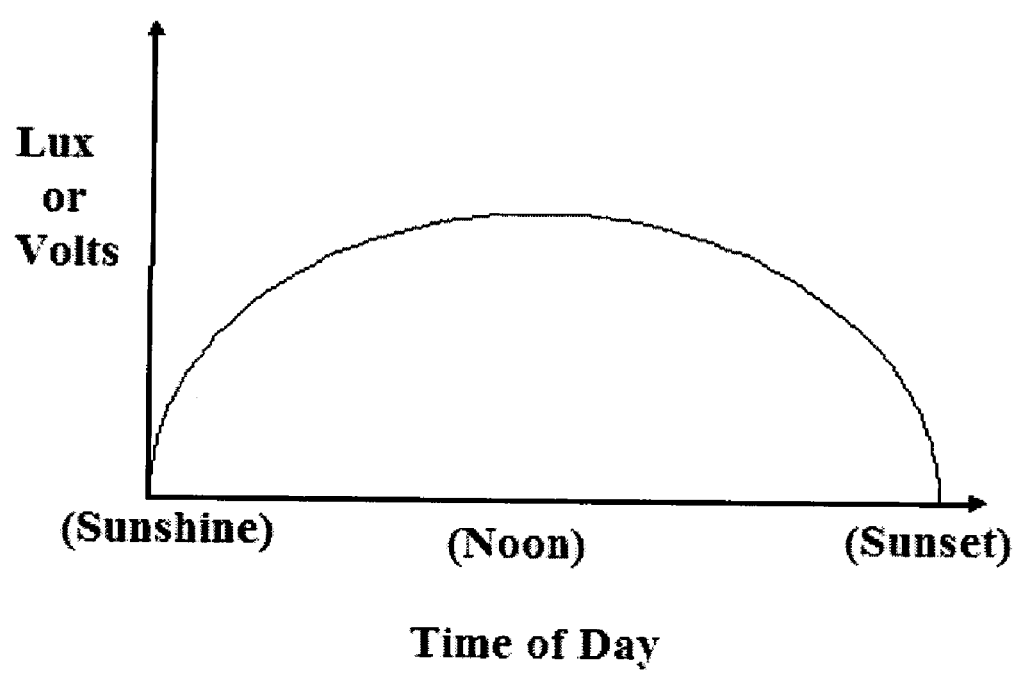
FIG. 7 is a schematic representation of the solar (photovoltaic) cell or light (photo) sensor electrical signal output showing the voltage profile during the hours of a typical day from sunshine to sunset.

In a third embodiment of the present invention also by referring to the accompanying drawings and in particular to FIGS. 11 through 22, an automatic electronic window tinting system in a transport vehicle comprises a display element on each window the shading of which can be controlled through displaying different circular or rectangular patterns on the window using pixels. The system provides different degrees of shading depending on the intensity of the incident sunlight by manipulating the pre-programmed patterns of the display element in the electronic windows. Instead of using windows with display element comprising one large pixel that can be switched OFF and ON to provide either completely clear or completely tinted windows, the window display element is divided into smaller pixels and switches (each pixel having it own switch) each of which can be switched OFF and ON to provide clear and dark display areas on each window thereby creating different patterns that provide different degree of shading. These patterns are pre-programmed in memory and are selectable and displayable by the controller on the window depending on the intensity of the incident sunlight as detected by the photocell sensors and received by the controller. The sunlight intensity is variable during the course of the day as shown in FIG. 7 or between summer and winter seasons. When the intensity of sunlight is higher, a higher voltage is outputted by the light sensor (photocell or PV solar cell) which is interpreted by the controller and the corresponding window is made darker. The window is made darker when more pixels are made dark (switched OFF) and less pixels are made clear (switched ON) such as the case for liquid crystal windows.

In the FIGS. 2 and 3, the automatic electronic window tinting system in a transport vehicle can shade completely the front window for security and privacy or partially, wherein the upper half only is shaded when the automobile is running, for safe driving. Same wise, the passenger and drivers windows can be shaded completely for security and privacy or partially wherein a small area of the window near the side mirrors are not shaded, when the automobile is running, for safe driving.

Figure 8:
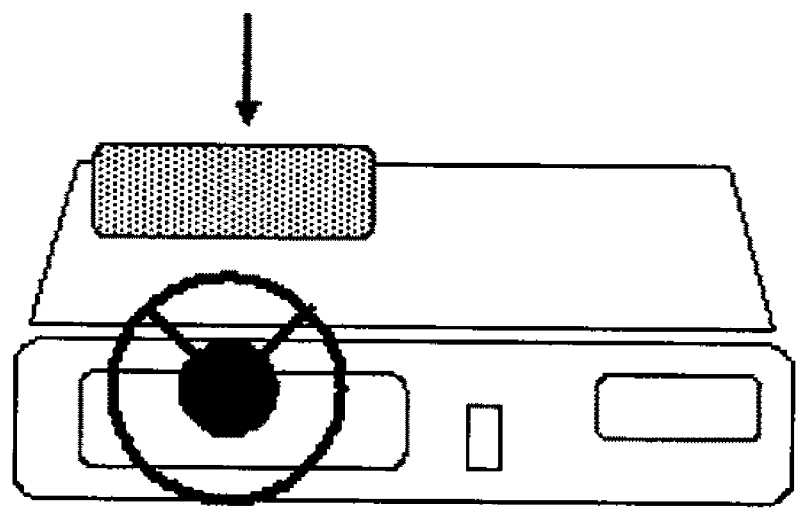
FIG. 8 is a perspective schematic representation of one embodiment of the invention within its environment in the form of a sun visor comprising automatic electronic window shading system.

In a fourth embodiment of the present invention also by referring to the accompanying drawings and in particular to FIG. 8, an automatic electronic window tinting system in a transport vehicle wherein the display window may be another fixed or attachable/removable window or panel inside a vehicle such as the windshield visor comprising a display element the shading of which can be controlled through displaying different patterns using plurality of pixels or through using just one large pixel.

Figure 4:
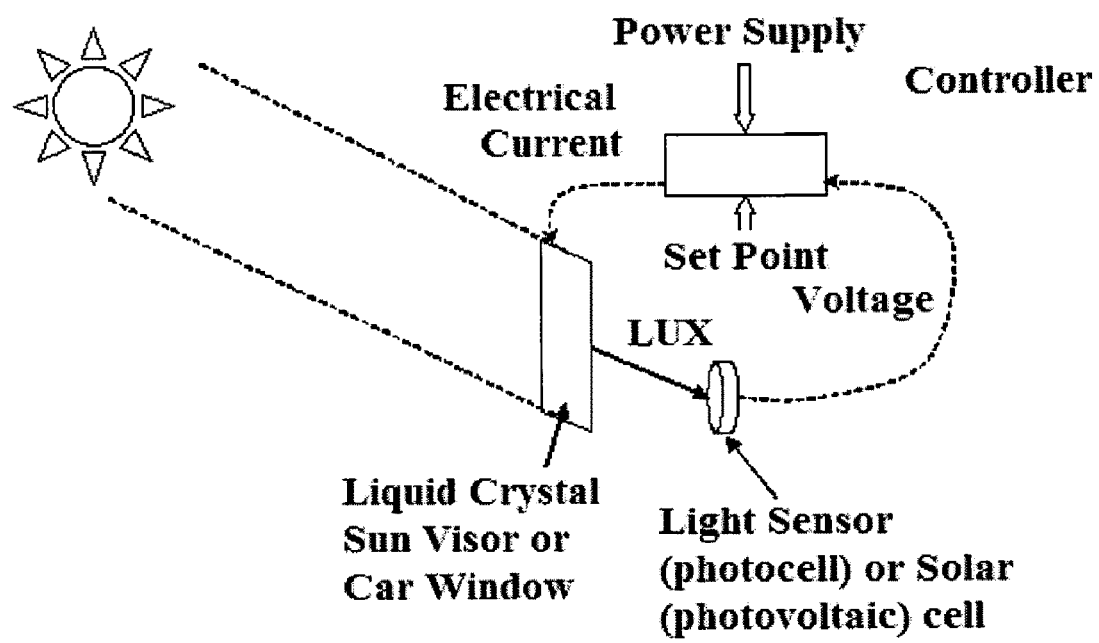
FIG. 4 is a perspective schematic representation of an automatic electronic window tinting system comprising a feedback control system with an interior light sensor (photocell) or a solar (photovoltaic) cell arrangement constructed according to one embodiment of the present invention.

In a fifth embodiment of the present invention also by referring to the accompanying drawings and in particular to FIG. 4, an automatic electronic window tinting system comprises a light sensor placed behind the windows inside the building or transport vehicle to enable both the controller and the user to determine the light intensity inside the vehicle whereby the system uses to adjust the shading inside the vehicle by tinting the window to a pre-specified level controllable by a knob (rheostat) and/or electronically to maintain a specified voltage.

Figure 23:
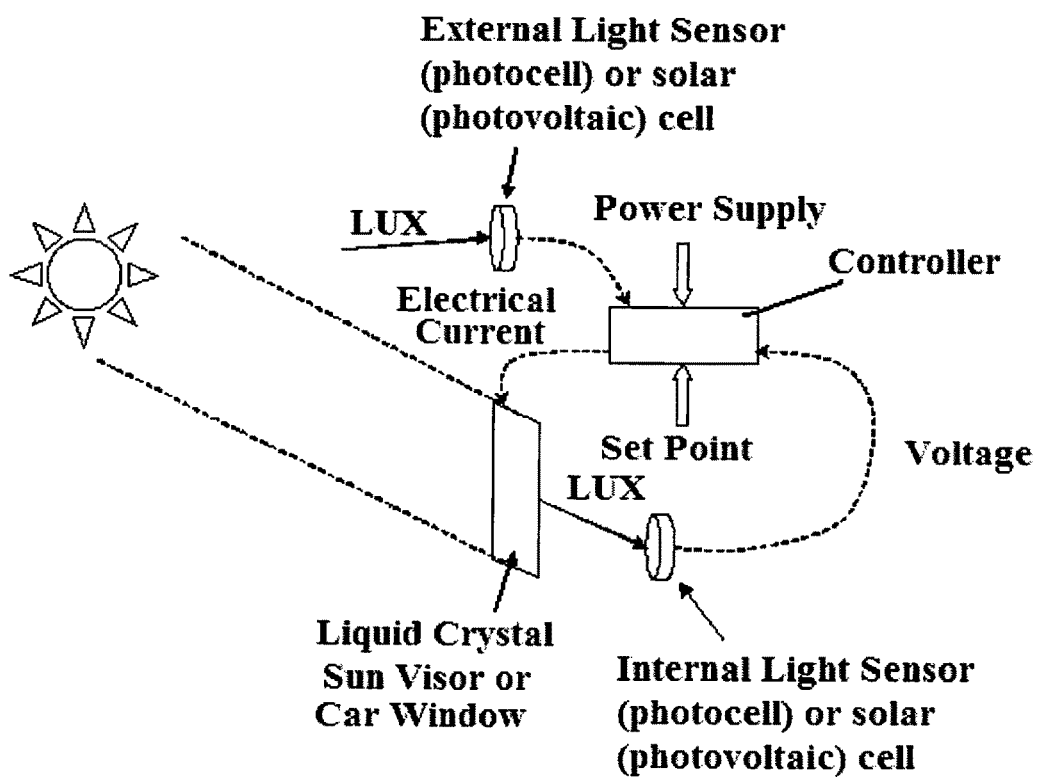
FIG. 23 is a perspective schematic representation of an automatic electronic window tinting system comprising feed forward control system with both interior and exterior light sensors (photocell) or a solar (photovoltaic) cell arrangement constructed according to one embodiment of the present invention.
Figure 24:
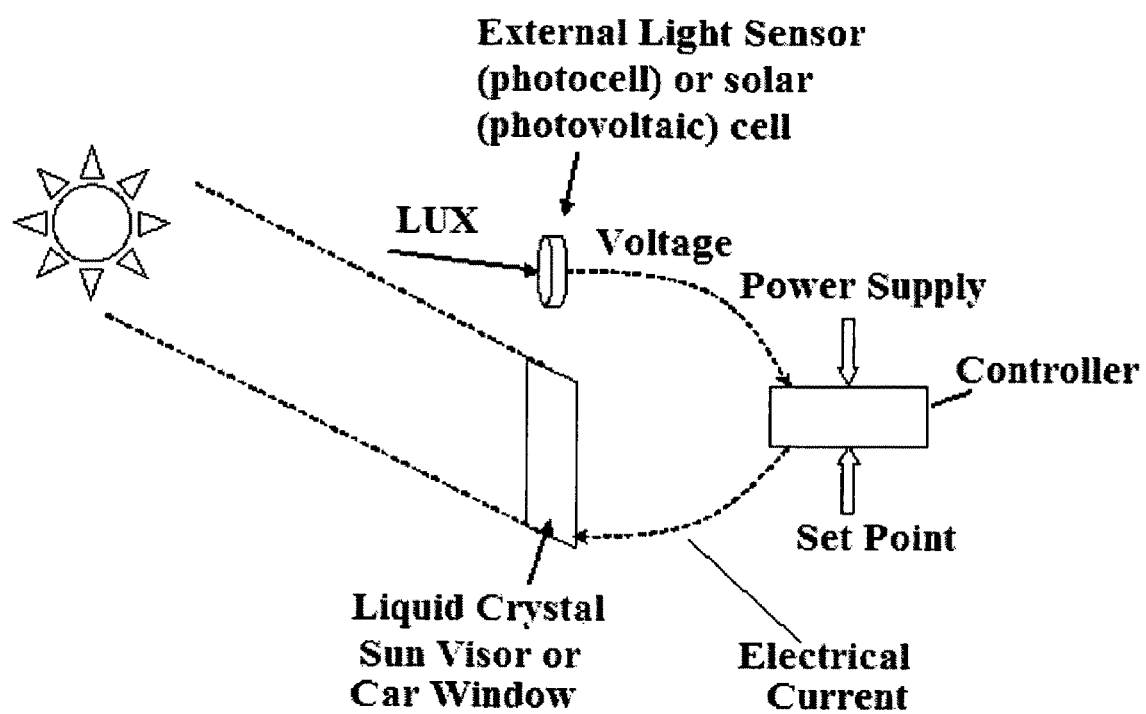
FIG. 24 is a perspective schematic representation of an automatic electronic window tinting system comprising a feedback control system with an exterior light sensor (photocell) or a solar (photovoltaic) cell arrangement constructed according to one embodiment of the present invention.

In a sixth embodiment of the present invention also by referring to the accompanying drawings and in particular to FIG. 23, an automatic electronic window tinting system further comprises an additional light sensor placed behind the window of a building or vehicle to enable both the controller and the user to determine the light intensity inside the vehicle and provide a set point (target LUX or voltage value to a desired shading inside the vehicle) which the system uses to adjust/offset the acceptable voltage level for the system to start tinting.

Disclaimers

Although the present invention has been described with reference to the preferred embodiment thereof, it is apparent to those skilled in the art that a variety of modifications and changes may be made without departing from the scope of the present invention which is intended to be defined by the appended claims.

The skilled in the art will easily recognize that the automatic electronic window shading system of the present invention maybe integrated with or incorporated into other automatic/manual devices and new installation techniques that provide electronic tinting using technology available to the skilled in the art without further experimentation and are all claimed under the scope of this invention.

The methods of the present invention have been explained with reference to plurality of references the teachings of which are all incorporated herein by reference.

Equivalents

From the foregoing description, one skilled in the art can easily ascertain the essential characteristics of this invention and, without departing from the spirit and scope thereof, can make various changes and modifications of the invention to adapt it to various usages and conditions. Such variations and changes may include, for example, altering the number of components or using equivalents. It is believed that such can be accomplished without excessive experimentation. In any case, any such variations are all claimed under the scope of this invention.

This invention has been described hereinabove, although with reference to a plurality of illustrative and preferred embodiments, it is to be understood that is in no way to be construed as limiting but only to provide examples. However, it is readily appreciated that, from reading this disclosure, the invention may be embodied in other specific forms without departing from the spirit or essential characteristics or attributes to bring modifications by replacing some elements of this invention as practiced by their equivalents, which would achieve the same goal thereof and accordingly reference should be made to the appended claims, rather than to the foregoing specification, as indicating the scope of the invention. Accordingly, those skilled in the art will recognize or be able to ascertain, using no more than routine experimentation, many equivalents to the specific embodiments and the scope of the invention being indicated by the appended claims described herein. Such equivalents, obvious variations, and all changes which come within the meaning and equivalency of the claims are therefore intended to be encompassed therein and are deemed covered by the claims of this invention.

What I claim as my invention is:

1. An automatic electronic shading system for an enclosure, comprising:
   a plurality of light sensors adapted for mounting on an enclosure, each said light sensor detecting ambient light intensity from a unique direction with respect to the enclosure;
   a plurality of automatically tinting windows, each said light sensor being associated a respective one of said automatically tinting windows, each said automatically tinting window including a transparent window body and a display element secured to, and at least partially covering, the transparent window body; and
   means for at least partially tinting at least one of said plurality of automatically tinting windows responsive to the light sensor associated therewith detecting ambient light intensity from the unique direction associated therewith greater than a pre-set intensity threshold.

2. The automatic electronic shading system for an enclosure as recited in claim 1, wherein said plurality of light sensors are mounted on a roof of the enclosure.

3. The automatic electronic shading system for an enclosure as recited in claim 1, wherein said plurality of light sensors comprise:

a first light sensor for detecting ambient light intensity from a front of the enclosure;

a second light sensor for detecting ambient light intensity from a rear of the enclosure;

a third light sensor for detecting ambient light intensity from a first side of the enclosure; and a fourth light sensor for detecting ambient light intensity from a second side of the enclosure.

4. The automatic electronic shading system for an enclosure as recited in claim 1, further comprising means for actuating said display element such that said display element selectively displays a pre-set tinting pattern.

5. The automatic electronic shading system for an enclosure as recited in claim 1, further comprising means for actuating said display element such that said display element selectively tints a portion of the transparent window body associated therewith.

6. The automatic electronic shading system for an enclosure as recited in claim 1, further comprising means for actuating said display element such that said display element selectively covers the transparent window body associated therewith with a degree of shading proportional to the measured ambient light intensity detected by the light sensor associated therewith.

7. The automatic electronic shading system for an enclosure as recited in claim 1, wherein each said display element is selected from the group consisting of: a polymer dispersed liquid crystal display, an electrochromic display, a suspended particle device, a NanoChromics display, an organic electroluminescent display, and combinations thereof.

8. The automatic electronic shading system for an enclosure as recited in claim 7, further comprising means for manually adjusting a degree of shading generated by each said display element.

9. The automatic electronic shading system for an enclosure as recited in claim 8, further comprising a remote control for manually adjusting the degree of shading generated by each said display element.

10. The automatic electronic shading system for an enclosure as recited in claim 1, wherein each said display element has an ultraviolet-blocking layer formed thereon.

11. The automatic electronic shading system for an enclosure as recited in claim 1, wherein each said light sensor is mounted within the enclosure, behind a rear face of the automatically tinting window associated therewith.

12. The automotive accident alert system as recited in claim 1, further comprising at least one temperature sensor.

13. The automotive accident alert system as recited in claim 12, further comprising means for heating said display elements when the at least one temperature sensor measures a temperature below a pre-set temperature threshold.

* * * * *